(12) United States Patent
Verma et al.

(10) Patent No.: US 12,164,853 B2
(45) Date of Patent: Dec. 10, 2024

(54) METHOD FOR GENERATING ROUTING STRUCTURE OF SEMICONDUCTOR DEVICE

(71) Applicant: TAIWAN SEMICONDUCTOR MANUFACTURING COMPANY LTD., Hsinchu (TW)

(72) Inventors: Anurag Verma, Hsinchu (TW); Chi-Chun Liang, Hsinchu (TW); Meng-Kai Hsu, Hsinchu County (TW); Cheng-Yu Lin, Hsinchu County (TW); Pochun Wang, Hsinchu (TW); Hui-Zhong Zhuang, Kaohsiung (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 401 days.

(21) Appl. No.: 17/574,048

(22) Filed: Jan. 12, 2022

(65) Prior Publication Data

US 2023/0222278 A1    Jul. 13, 2023

(51) Int. Cl.
*G06F 30/392* (2020.01)
*G06F 30/394* (2020.01)
*G06F 119/18* (2020.01)

(52) U.S. Cl.
CPC .......... *G06F 30/392* (2020.01); *G06F 30/394* (2020.01); *G06F 2119/18* (2020.01)

(58) Field of Classification Search
CPC .. G06F 30/392; G06F 30/394; G06F 2119/18; G06F 30/39; G06F 30/398
See application file for complete search history.

(56) References Cited

U.S. PATENT DOCUMENTS

| | | | | |
|---|---|---|---|---|
| 2008/0111158 | A1* | 5/2008 | Sherlekar | G06F 30/392 716/112 |
| 2010/0237509 | A1* | 9/2010 | Wu | H01L 24/05 257/782 |
| 2012/0241986 | A1* | 9/2012 | Sherlekar | H01L 27/11807 257/E23.079 |
| 2012/0249182 | A1* | 10/2012 | Sherlekar | G06F 30/394 716/102 |
| 2014/0181774 | A1* | 6/2014 | Hatamian | G06F 30/392 716/122 |
| 2014/0229908 | A1* | 8/2014 | Sherlekar | G06F 30/394 716/120 |
| 2016/0055290 | A1* | 2/2016 | Weng | H01L 27/0886 716/112 |
| 2019/0311954 | A1* | 10/2019 | Kim | H01L 27/0207 |

(Continued)

*Primary Examiner* — Stacy Whitmore
(74) *Attorney, Agent, or Firm* — WPAT LAW; Anthony King

(57) ABSTRACT

The present disclosure provides a method and an apparatus for generating a layout of a semiconductor device. The method includes placing a first cell and a second cell adjacent to the first cell, placing a first conductive pattern in a first track of the first cell extending in a first direction, wherein the first conductive pattern is configured as an input terminal or an output terminal of the first cell, placing a second conductive pattern in a first track of the second cell extending in the first direction, wherein the second conductive pattern is configured as an input terminal or an output terminal of the second cell, and aligning the first conductive pattern with the second conductive pattern.

20 Claims, 12 Drawing Sheets

(56) References Cited

U.S. PATENT DOCUMENTS

2021/0209281 A1\* 7/2021 Ou ..................... G06F 30/3953
2021/0384186 A1\* 12/2021 Kim ..................... G06F 30/392
2022/0327277 A1\* 10/2022 Verma ................... G06F 30/394

\* cited by examiner

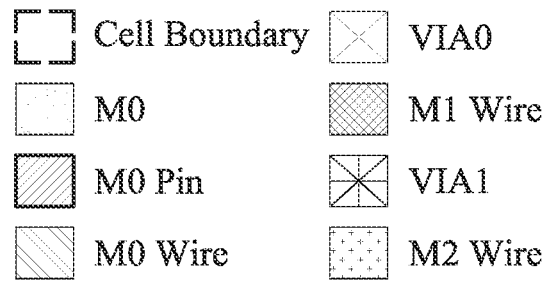
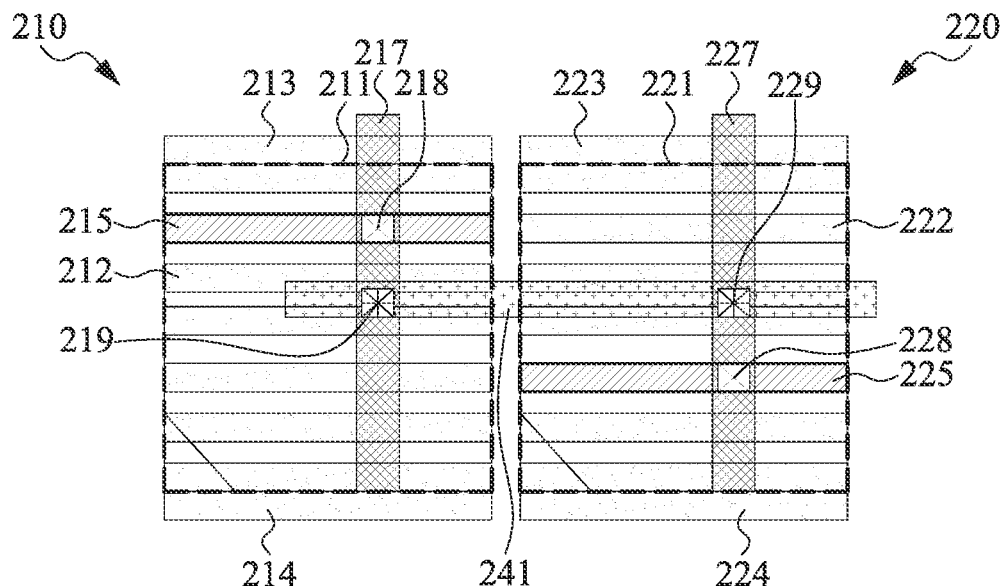
FIG. 2A-1
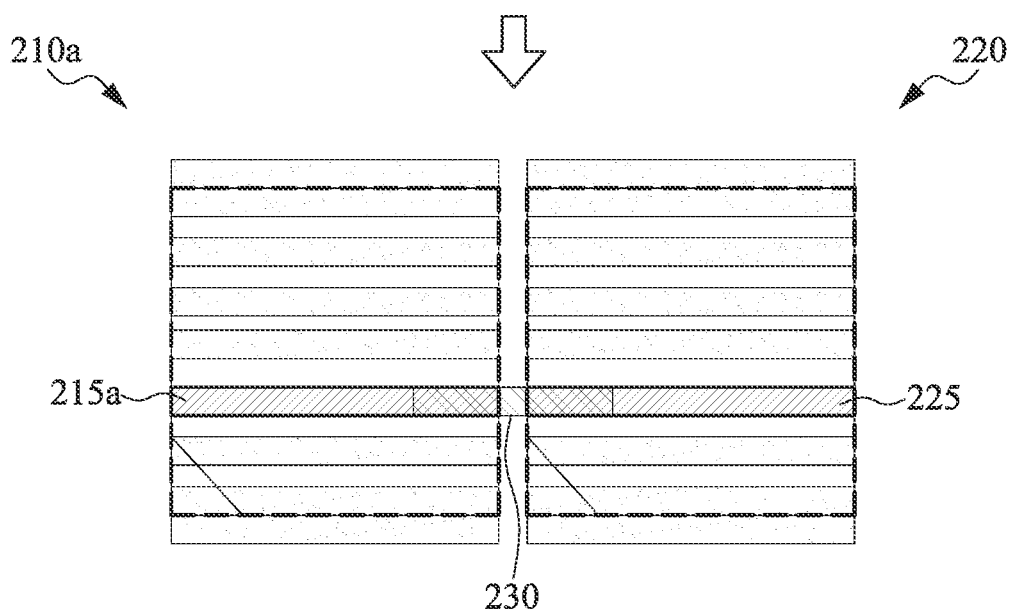
FIG. 2A-2

METHOD FOR GENERATING ROUTING STRUCTURE OF SEMICONDUCTOR DEVICE

BACKGROUND

In present cell layout methodology, standard cells have input or output terminals (pins) belonging to the same net connection. Belonging to the same net connection, the input or output terminals of standard cells are electrically connected to share the same signals. To connect the input/output terminals of one cell to another, the adjacent cells need routing resources in upper metal layers. In high density design, lower metal layer routing resources become critical, and can lead to severe design rule check (DRC) violations. Therefore, connecting the input/output terminals of adjacent cells through the upper metal layers can lead to congestion in high density design. The local direct connection (i.e. using same metal layer as pin shape, and only that layer) allows automatic placement and routing (APR) tools to free up routing resources from routing layers above, enabling more efficient pin access, and increasing the ability to reduce area requirements.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

FIGS. 2A-1 and 2A-2 are diagrams of a process for modifying a simulated integrated circuit design layout, in accordance with some embodiments of the present disclosure.

FIGS. 2B-1 and 2B-2 are diagrams of a process for modifying a simulated integrated circuit design layout, in accordance with some embodiments of the present disclosure.

DETAILED DESCRIPTION

Figure 1:
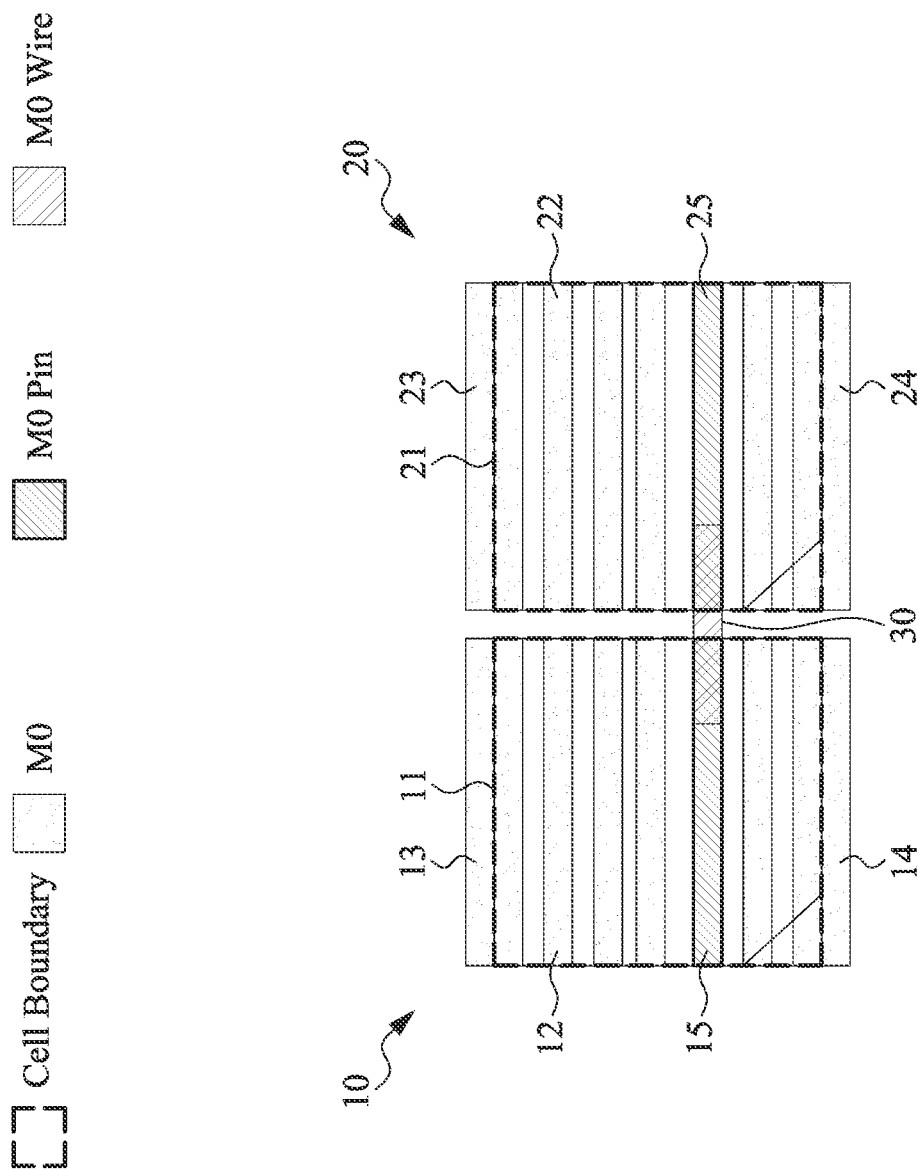
FIG. 1 is a diagram of a simulated integrated circuit design layout, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagram of a simulated integrated circuit design layout, in accordance with some embodiments of the present disclosure. The simulated integrated circuit design layout may include two cells 10 and 20.

FIG. 1 shows a top view of the simulated integrated circuit design layout. The simulated integrated circuit design layout can include multiple layers (such as substrate layer, active area, gate electrode, first metal layer (M0), second metal layer (M1), etc.) overlaid with one another along with various patterns in the respective layers. For clarity, some elements (such as active area and gate electrode) in the cells 10 and 20 are omitted. The cell 10 may include a cell boundary 11, one or more conductive segments (M0) 12, two power rails (M0) 13 and 14, and a conductive pattern 15.

Referring to FIG. 1, in some embodiments, the conductive segments (M0) 12 are arranged in a first layer (M0). The conductive segments 12 are included in a cell boundary 11, wherein the cell boundary 11 may be simulated to identify each cell. The conductive segments 12 may extend horizontally. The number of conductive segments 12 is not limited in the cell 10. For example, the number of conductive segments 12 in the cell 10 may be five. In other embodiments, the number of conductive segments 12 in the cell 10 can be greater than or fewer than five.

In some embodiments, the conductive segments in the first layer, such as the conductive segments 12, are allocated into tracks for the cell 10, throughout the present disclosure, the term "track" is defined as predetermined regions of the cell 10 from a top-view perspective in which conductive segments or power rails can be located. In some embodiments, the track is in a strip or line profile. The number of parallel tracks and the track pitch can be predetermined in order to fulfill design rules.

The power rails 13 and 14 are arranged in the first layer (M0). The power rails 13 and 14 extend parallel to the conductive segments 12. The power rails 13 and 14 are on opposite sides of the cell 10. For example, the power rails 13 and 14 are arranged on an upper cell side and a lower cell side, respectively, of the cell 10. In some embodiments, the power rails 13 and 14 can be configured to supply a voltage VDD and a voltage VSS, respectively. In some embodiments, the voltage VDD can be a positive voltage and the voltage VSS can be ground.

In some embodiments, a width of the power rails 13 and 14 along a vertical orientation substantially exceeds that of the conductive segments 12 along a vertical orientation. In other embodiments, the power rails 13 and 14 and the conductive segments 12 can have substantially equal widths along a vertical orientation. In some embodiments, the conductive segments 12 are equally spaced between the power rails 13 and 14 along a vertical orientation. In addition, the power rails 13 and 14 are spaced from its adjacent conductive segment 12 by a distance along a vertical orientation.

In some embodiments, the cell height of the cell 10 can be defined as a pitch between the power rails 13 and 14 measured along a vertical orientation. The cell height of the cell 10 can be determined according to the total number of conductive segments 12 accommodated within the cell 10. As shown in FIG. 1 for the depicted embodiment, the total number of conductive segments 12 is five.

In some embodiments, one of the conductive segments 12 can be a conductive pattern 15 (M0 pin). The number of conductive patterns 15 in the cell 10 is not limited. In some embodiments, the conductive pattern 15 may be placed in the fourth track of the cell 10 from the upper cell side. The conductive pattern 15 can be configured as an input terminal or an output terminal of the cell 10. In some embodiments, the input signal may be received through the conductive pattern 15. In some embodiments, the output signal of the cell 10 may be transmitted through the conductive pattern 15 to other elements.

Referring to FIG. 1, the cell 20 is adjacent to the cell 10. In some embodiments, the cell 20 may include a cell boundary 21, one or more conductive segments (M0) 22, two power rails (M0) 23 and 24, and a conductive pattern 25.

Referring to FIG. 1, in some embodiments, the conductive segments (M0) 22 are arranged in the first layer (M0). The conductive segments 22 are included in the cell boundary 21, wherein the cell boundary 21 can be utilized to identify each cell. The conductive segments 22 may extend horizontally. The number of conductive segments 22 is not limited in the cell 20. For example, the number of conductive segments 22 in the cell 20 may be five. In other embodiments, the number of conductive segments 22 in the cell 20 can be greater than or fewer than five. In some embodiments, the conductive segments 22 in the first layer are allocated into tracks for the cell 20.

The power rails 23 and 24 are arranged in the first layer (M0). The power rails 23 and 24 extend parallel to the conductive segments 22. The power rails 23 and 24 are on opposite sides of the cell 20. For example, the power rails 23 and 24 can be arranged on an upper cell side and a lower cell side, respectively, of the cell 20. In some embodiments, the power rails 23 and 24 are configured to supply a voltage VDD and a voltage VSS, respectively. In some embodiments, the voltage VDD can be a positive voltage and the voltage VSS can be ground.

In some embodiments, a width of the power rails 23 and 24 along a vertical orientation substantially exceeds that of the conductive segments 22 along a vertical orientation. In other embodiments, the power rails 23 and 24 and the conductive segments 22 can have substantially equal widths along a vertical orientation. In some embodiments, the conductive segments 22 can be equally spaced between the power rails 23 and 24 along a vertical orientation. In addition, the power rails 23 and 24 are spaced apart from its adjacent conductive segment 22 by a distance along a vertical orientation.

In some embodiments, the cell height of the cell 20 can be defined as a pitch between the power rails 23 and 24 measured along a vertical orientation. The cell height of the cell 20 can be determined according to a total number of conductive segments 22 accommodated within the cell 20. As shown in FIG. 1 for the depicted embodiment, the total number of conductive segments 22 is five.

In some embodiments, one of the conductive segments 22 may be a conductive pattern 25 (M0 pin). The number of conductive patterns 25 in the cell 20 is not limited. In some embodiments, the conductive pattern 25 may be placed in the fourth track of the cell 20 from the upper cell side. The conductive pattern 25 can be configured as an input terminal or an output terminal of the cell 20. In some embodiments, the input signal can be received through the conductive pattern 25. In some embodiments, the output signal of the cell 20 can be transmitted through the conductive pattern 25 to other elements.

In some embodiments, the conductive pattern 15 of the cell 10 can be aligned with the conductive pattern 25 of the cell 20. The conductive pattern 15 can align with the conductive pattern 25 horizontally. In some embodiments, a direct conductive pattern 30 (M0 wire) may extend from the cell 10 to the cell 20. The conductive pattern 30 can extend beyond the cell boundary 11 of the cell 10. The conductive pattern 30 can extend beyond the cell boundary 21 of the cell 20.

The direct conductive pattern 30 can electrically connect the cell 10 and the cell 20. The direct conductive pattern 30 is arranged in the first layer. That is, the direct conductive pattern 30 can be substantially level with conductive patterns 15 and 25 in a cross-sectional perspective.

In some embodiments, the conductive pattern 15 can electrically connect to the conductive pattern 25 through the direct conductive pattern 30.

In existing process of a simulated integrated circuit design layout, however, the conductive pattern (such as conductive patterns 15 and 25) in the adjacent cells may not inherently align in the design layout, so they cannot be directly connected. The subject disclosure provides methods for re-arranging the elements in the cell to solve this problem.

Figures 1, 2B:
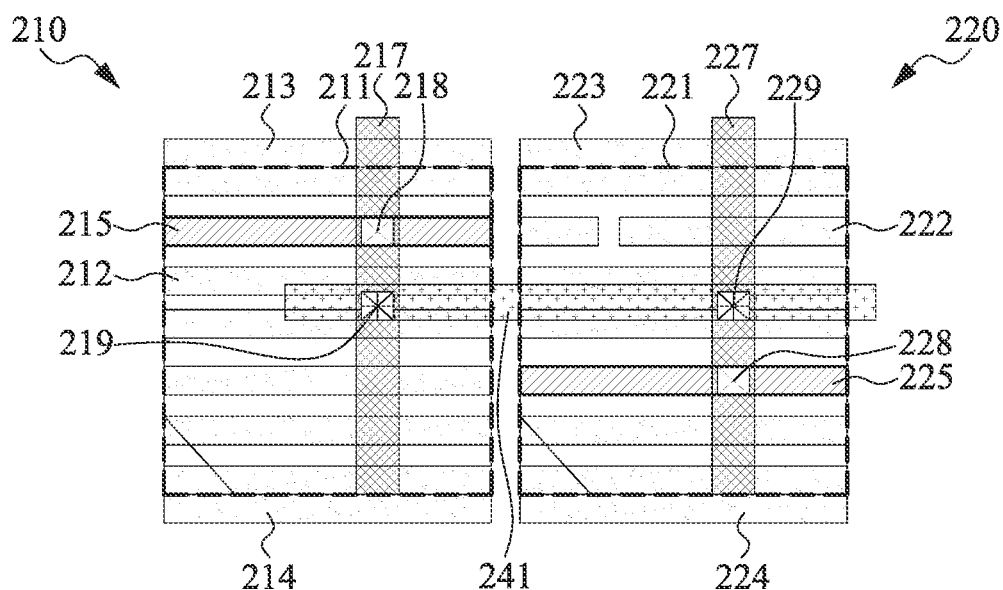
Figures 2, 2B:
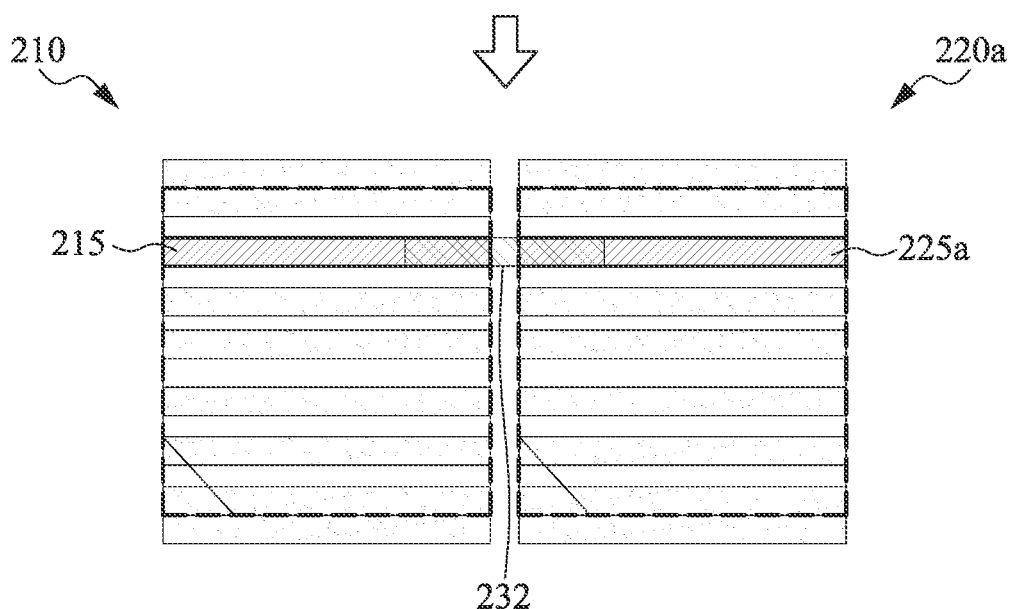

FIGS. 2A-1 and 2A-2 are diagrams of variants of a simulated integrated circuit design layout, in accordance with some embodiments of the present disclosure. The simulated integrated circuit design layout in FIG. 2A-1 can be modified into the simulated integrated circuit design layout in FIG. 2A-2. Similar to the simulated integrated circuit design layout shown in FIG. 1, some elements (such as active area and gate electrode) in FIGS. 2A-1 and 2A-2 are omitted for clarity.

Referring to FIG. 2A-1, the simulated integrated circuit design layout may include two cells 210 and 220. The cell 210 includes conductive segments 212, conductive pattern 215, and conductive vias 218 and 219. The cell 220 includes conductive segments 222, a conductive pattern 225, and conductive vias 228 and 229. The simulated integrated circuit layout may include a conductive segment 217 above cell 210. The simulated integrated circuit layout may include a conductive segment 227 above the cell 220. The simulated integrated circuit layout may include a conductive segment 241 extending between the cell 210 and the cell 220.

Referring to FIG. 2A-1, similar to cell 10 in FIG. 1, the conductive segments (M0) 212 are arranged in a first layer (M0). The conductive segments 212 may extend horizontally. The number of conductive segments 212 is not limited in the cell 210. For example, the number of conductive segments 212 may be five. In other embodiments, the number of conductive segments 212 in the cell 210 can be greater than or fewer than five. In some embodiments, the conductive segments 212 in the first layer are allocated into tracks for the cell 210.

In some embodiments, one of the conductive segments 212 may be a conductive pattern 215 (M0 pin). The number of conductive patterns 215 in the cell 10 is not limited. In some embodiments, the conductive pattern 215 may be placed in the first track of the cell 210 from the upper cell side. The conductive pattern 215 can be configured as an input terminal or an output terminal of the cell 210. In some embodiments, the input signal can be received through the conductive pattern 215. In some embodiments, the output signal of the cell 210 can be transmitted through the conductive pattern 215 to other elements.

In some embodiments, the conductive segment 217 is arranged in a second layer (M1). The second layer is above the first layer. In other words, the conductive segment 217 is above the conductive segments 212. In some embodiments, the conductive segment 217 may extend perpendicular to the conductive segments 212. The conductive segment 217 may electrically connect to the conductive segments 212. In some embodiments, the conductive segment 217 can be connected to the conductive pattern 215. The conductive segment 217 can be electrically connected to the conductive pattern 215 through a conductive via 218 (VIA0), where the conductive via 218 can be disposed between the first layer and the second layer. In some embodiments, the conductive segment 217 and the conductive pattern 215 may overlap from a top-view perspective. The conductive via 218 can be disposed in the overlapping region of the conductive segment 217 and the conductive pattern 215.

Referring to FIG. 2A-1, the cell 220 is adjacent to the cell 210. In some embodiments, the cell 220 is similar to the cell 210. For example, the conductive segment (M0) 222 may correspond to the conductive segments 212; the conductive segment 227 may correspond to the conductive segment 217; and the conductive via 228 may correspond to the conductive via 218.

In some embodiments, the conductive pattern 225 may correspond to the conductive pattern 215, while the conductive pattern 225 may be placed in the fourth track of the cell 220 from the upper cell side.

In some embodiments, the conductive segment 227 and the conductive pattern 225 may overlap from a top-view perspective. The conductive via 228 may be disposed in the overlapping region of the conductive segment 227 and the conductive pattern 225. For example, the conductive via 228 may be disposed on the fourth track, i.e., the conductive pattern 225.

In some embodiments, the conductive segment 241 is arranged in a third layer (M2).

The third layer is above the first layer. The second layer is between the first layer and the third layer. That is, the conductive segment 241 is disposed on the conductive segments 212, 217, 222, and 227. In some embodiments, the conductive segment 241 may extend parallel to the conductive segments 212. The conductive segment 241 may connect to the conductive segment 217 through the conductive via 219 (VIA1) and connect to the conductive segment 227 through the conductive via 229 (VIA1). The conductive vias 219 and 229 may be disposed between the second layer and the third layer.

In some embodiments, the conductive segment 217 and the conductive segment 241 may overlap from a top-view perspective. The conductive via 219 can be disposed in the overlapping region of the conductive segment 217 and the conductive segment 241. Similarly, the conductive segment 227 and the conductive segment 241 may overlap from a top-view perspective. The conductive via 229 can be disposed in the overlapping region of the conductive segment 227 and the conductive segment 241. Accordingly, the conductive segment 241 can electrically connect the cell 210 and 220. The conductive patterns 215 and 225 may be electrically connected through the conductive segment 241.

Referring to FIG. 2A-2, the cell 220 in FIG. 2A-2 may correspond to the cell 220 in FIG. 2A-1. The cell 210a in FIG. 2A-2 is similar to the cell 210 in FIG. 2A-1, with a difference therebetween being that in FIG. 2A-2, the location of the conductive pattern 215a is placed in the fourth track of the cell 210a from the upper cell side.

The conductive pattern 215 located in the first track is re-arranged to become the conductive pattern 215a in the fourth track. In some embodiments, the conductive pattern 215a may align with the conductive pattern 225 of the cell 220. The conductive pattern 215a may align with the conductive pattern 225 horizontally. In some embodiments, a direct conductive pattern 230 (M0 wire) may extend from the cell 210a to the cell 220. The conductive pattern 230 can extend beyond the cell boundary of the cell 210a. The conductive pattern 230 can extend beyond the cell boundary of the cell 220. Conductive segment 230 is similar to 241, with difference being that the conductive segment 230 is in the same layer as the conductive segments 215 of the cell 210a and the conductive segments 222 of the cell 220, and enables routing in the first layer (M0 pin shape).

The direct conductive pattern 230 can electrically connect the cell 210a and the cell 220. The direct conductive pattern 230 is arranged in the first layer. That is, the direct conductive pattern 230 is substantially level with conductive patterns 215a and 225 in a cross-sectional perspective. In some embodiments, the conductive pattern 215a may electrically connect to the conductive pattern 225 through the direct conductive pattern 230. The direct conductive pattern 230 can be located between the fourth track of the cells 210a and 220. In some embodiments, the direct conductive pattern 230 may correspond to the direct conductive pattern 30 in FIG. 1.

With the direct conductive pattern 230, routing resources such as conductive segments 217, 227, and 241, and conductive vias 218, 219, 228, and 229 may be released. Therefore, the density of external routing and conductive segments around the cells 210 and 220 can be reduced. In addition, concise connections between adjacent cells can facilitate reducing the power consumption of a semiconductor device.

FIGS. 2B-1 and 2B-2 are diagrams of variants of a simulated integrated circuit design layout, in accordance with some embodiments of the present disclosure. Similar to FIGS. 2A-1 and 2A-2, the simulated integrated circuit design layout in FIG. 2B-1 can be modified into the simulated integrated circuit design layout in FIG. 2B-2.

FIG. 2B-1 may correspond to FIG. 2A-1. As shown in FIG. 2B-1, the simulated integrated circuit design layout may include two cells 210 and 220. The cell 210 includes conductive segments 212 and 217, a conductive pattern 215, and conductive vias 218 and 219. The cell 220 includes conductive segments 222 and 227, a conductive pattern 225, and conductive vias 228 and 229. The simulated integrated circuit layout shown in FIG. 2B-1 may include a conductive segment 241 extending between the cell 210 and the cell 220. Detailed descriptions of those elements can be found in paragraphs associated with FIG. 2A-1, and thus are not repeated here.

FIG. 2B-2 may be similar to FIG. 2A-2. The cell 220a in FIG. 2B-2 is similar to the cell 220 in FIG. 2B-1, with one of the differences therebetween being that in FIG. 2B-2, the conductive pattern 225a is located in the first track of the cell 220a from the upper cell side.

The conductive pattern 225 located in the fourth track is re-arranged to become the conductive pattern 225a in the first track. In some embodiments, the conductive pattern 225a may align with the conductive pattern 215. The conductive pattern 225a may align with the conductive pattern 215 horizontally. In some embodiments, a direct conductive pattern 232 (M0 wire) may extend from the cell 210 to the cell 220a.

The direct conductive pattern 232 can electrically connect the cell 210 and the cell 220a. The direct conductive pattern 232 is arranged in the first layer. That is, the direct conductive pattern 232 is substantially level with conductive patterns 215 and 225a in a cross-sectional perspective. In some embodiments, the conductive pattern 225a may electrically connect to the conductive pattern 215 through the direct conductive pattern 232. In some embodiments, the direct conductive pattern 232 may refer to the direct conductive pattern 30 in FIG. 1. The conductive pattern 232 can extend beyond the cell boundary of the cell 210. The conductive pattern 232 can extend beyond the cell boundary of the cell 220a.

With the direct conductive pattern 232, the routing resources such the conductive segments 217, 227, and 241, and conductive vias 218, 219, 228, and 229 may be released for other functions. Therefore, the density of external routing and conductive segments around the cells 210 and 220 can be reduced. In addition, concise connections between adjacent cells can facilitate reducing the power consumption of a semiconductor device.

Figure 3:
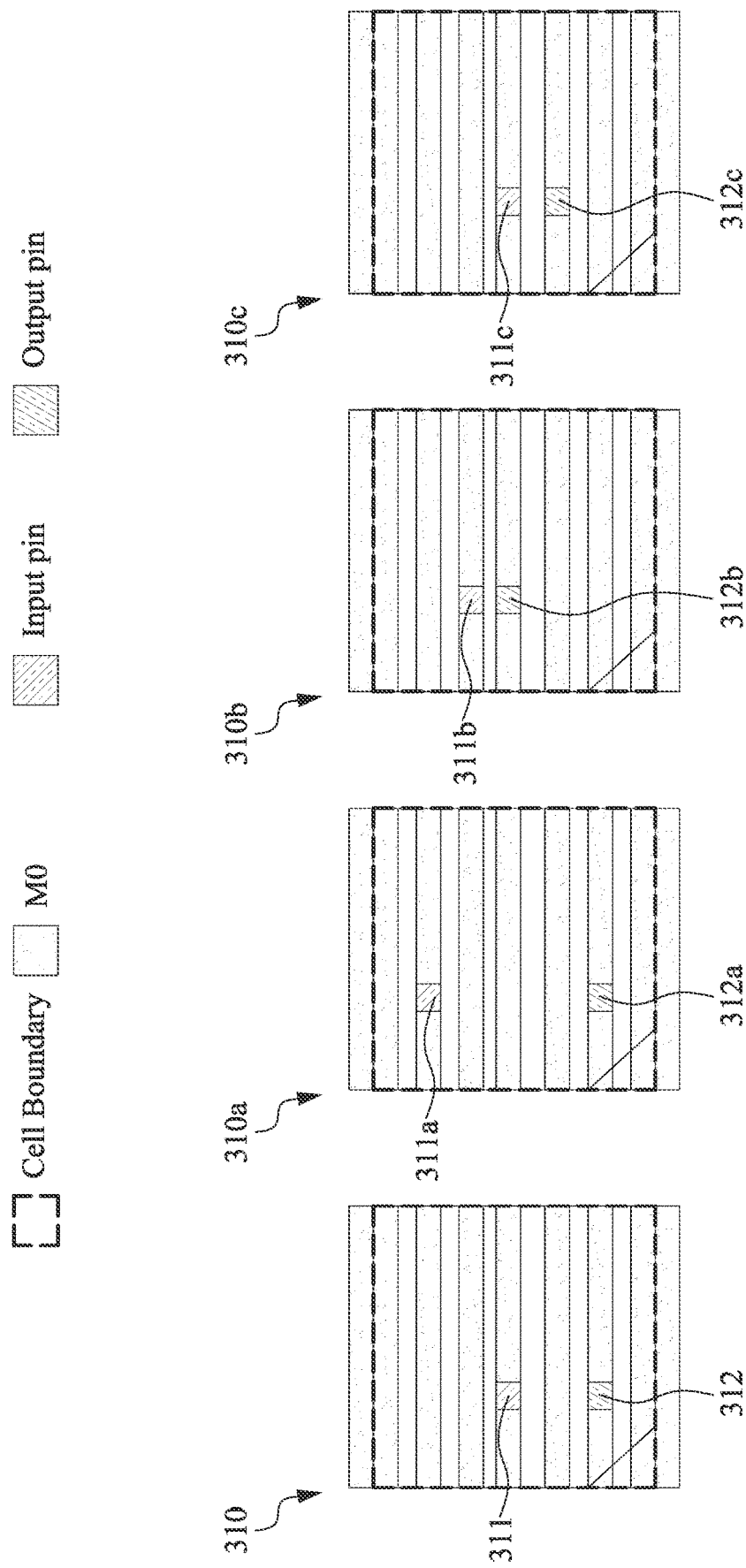
FIG. 3 is a diagram of cell variants of a simulated integrated circuit design layout, in accordance with some embodiments of the present disclosure.

FIG. 3 is a diagram of variants of a cell of a simulated integrated circuit design layout, in accordance with some embodiments of the present disclosure. FIG. 3 provides a standard cell 310 and three routing equivalent (REQ) cells (or REQ variant cells) 310a, 310b, and 310c. The REQ variant cell of the standard cell 310 is not limited and may be provided according to the design needs. The REQ cell has identical cell dimensions (such as area, width, and height), number of pins, and cell functionality as the standard cell, differing only in pin locations.

As shown in FIG. 3, the standard cell 310 may have five tracks for conductive segments. The standard cell 310 may include an input pin 311 and an output pin 312. In some embodiments, the input pin 311 may be disposed on the third track of the cell 310, and the output pin 312 may be disposed on the fifth track of the cell 310. With the input pin 311 is located at the third track, the third track may be a conductive pattern configured as an input terminal of the standard cell 310. Alternatively, the fifth track may be a conductive pattern configured as an output terminal of the standard cell 310, when the output pin 312 is located at the fifth track.

Referring to FIG. 3, the REQ variant cell 310a is similar to the standard cell 310, with a difference therebetween being that in cell 310a, the location of an input pin 311a is different from the input pin 311. In some embodiments, the input pin 311a may be disposed on the first track of the cell 310a, and the output pin 312a may be disposed on the fifth track of the cell 310a (which is the same as the output pin 312).

Referring to FIG. 3, the REQ variant cell 310b is similar to the standard cell 310, with the difference therebetween being that in cell 310b, the location of an input pin 311b is different from the input pin 311, and that the location of an output pin 312b is different from the output pin 312. In some embodiments, the input pin 311b may be disposed on the second track of the cell 310b, and the output pin 312b may be disposed on the third track of the cell 310b.

Referring to FIG. 3, the REQ variant cell 310c is similar to the standard cell 310, with the difference therebetween being that in cell 310c, the location of an output pin 312c is different from the output pin 312. In some embodiments, the output pin 312c may be disposed on the fourth track of the cell 310c, and the input pin 311c may be disposed on the third track of the cell 310c (which is the same as the input pin 311). Cells 310a/310b/310c are few of the possible layout as examples. More layouts available to align the conductive pattern with those of neighbor cells (as shown in FIGS. 2A-2 and 2B-2) can be generated or used.

Figure 4A:
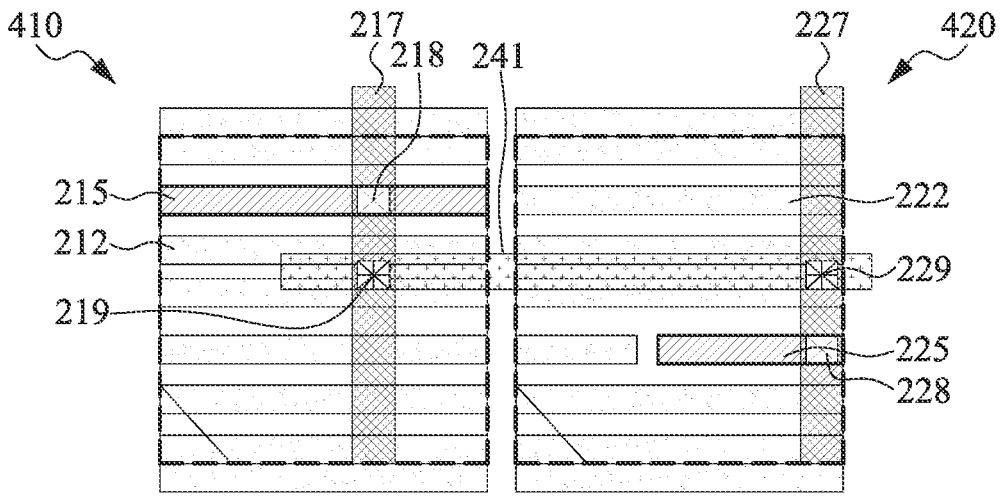
FIGS. 4A, 4B, and 4C are diagrams of a process for modifying a simulated integrated circuit design layout, in accordance with some embodiments of the present disclosure.
Figure 4B:
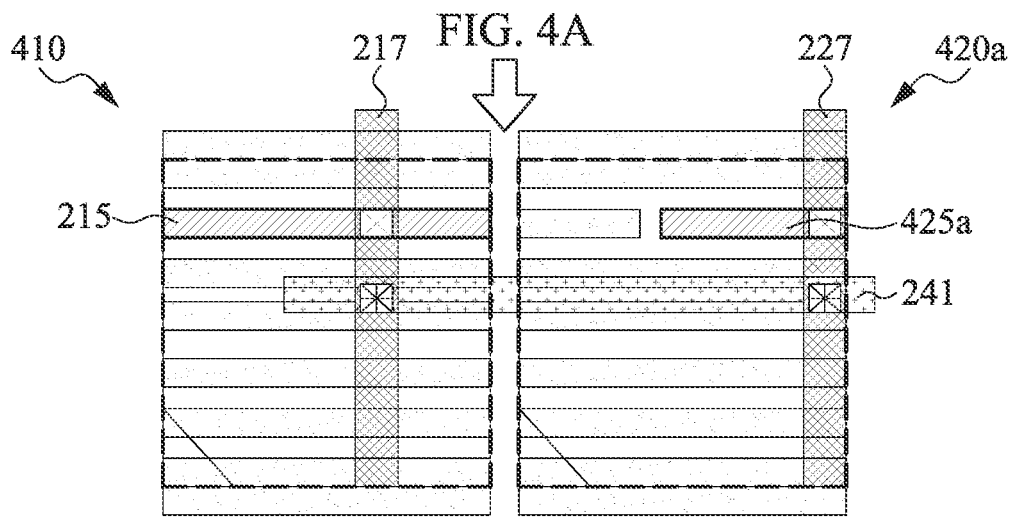
Figure 4C:
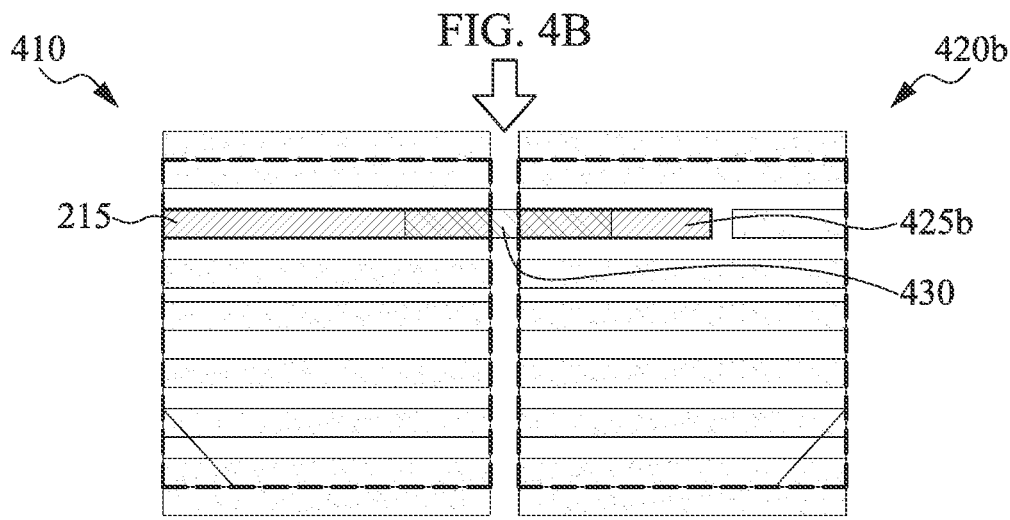

FIGS. 4A, 4B, and 4C are diagrams of modification of a simulated integrated circuit design layout, in accordance with some embodiments of the present disclosure. The simulated integrated circuit design layout in FIG. 4A can be modified into the simulated integrated circuit design layout in FIG. 4B, and then into the simulated integrated circuit design layout in FIG. 4C.

FIG. 4A is similar to FIG. 2A-1. As shown in FIG. 4A, the simulated integrated circuit design layout may include two cells 410 and 420. The cell 410 includes conductive segments 212, a conductive pattern 215, and conductive vias 218 and 219. The cell 420 includes conductive segments 222, a conductive pattern 225, and conductive vias 228 and 229. The simulated integrated circuit layout may include a conductive segment 217 above cell 410. The simulated integrated circuit layout may include a conductive segment 227 above the cell 420. The simulated integrated circuit layout may include a conductive segment 241 extending between the cell 410 and the cell 420. Detailed description of such elements may be found in FIG. 2A-1, and thus are not repeated here. The differences between FIG. 2A-I and FIG. 4A are that in FIG. 4A, the fourth track of the cell 420 is divided into a left portion and a right portion, wherein the right portion may be the conductive pattern 225.

Referring to FIG. 4B, the cell 410 in FIG. 4B may correspond to the cell 410 in FIG. 4A. The cell 420a in FIG. 4B is similar to the cell 420 in FIG. 4A, with a difference therebetween being that in FIG. 4B, the location of the conductive pattern 425a is placed in the first track of the cell 420a from the upper cell side. In other words, the elements in the fourth track may be swapped with the elements in the first track. In some embodiments, the conductive pattern 225 located in the fourth track is re-arranged to become the conductive pattern 425a in the first track. In some embodiments, the conductive pattern 425a may align with the conductive pattern 215. The conductive pattern 425a may align with the conductive pattern 215 horizontally.

As shown in FIG. 4B, the conductive pattern 215 may electrically connect to the conductive pattern 425a through the conductive segments 217, 241 and 227.

Referring to FIG. 4C, the cell 410 in FIG. 4C may correspond to the cell 410 in FIG. 4B. The cell 420b in FIG. 4C is similar to the cell 420a in FIG. 4B, with a difference therebetween being that in FIG. 4C, the elements in the cell 420b are symmetrical to the cell 420a in FIG. 4B. In some embodiments, the cell 420b in FIG. 4C can be obtained by flipping the cell 420a in FIG. 4B along a center of symmetry of the cell 420a extending vertically.

As shown in FIG. 4C, the conductive pattern 425b may be aligned with the conductive pattern 215 of the cell 410 horizontally. In some embodiments, the conducive pattern 425b may be adjacent to the conductive pattern 215. In some embodiments, a direct conductive pattern 430 (M0 wire) may extend from the cell 410 to the cell 420b. The direct conductive pattern 430 can electrically connect the cell 410 to the cell 420b. The direct conductive pattern 430 may be located between the fourth track of the cell 410 and the cell 420b. In some embodiments, the direct conductive pattern 430 may correspond to the direct conductive pattern 30 in FIG. 1.

With the direct conductive pattern 430, the routing resources such the conductive segments 217, 227, and 241, and conductive vias 218, 219, 228, and 229 may be released for other functions. Therefore, the density of external routing and conductive segments around the cells 410 and 420b can be reduced. In addition, concise connections between adjacent cells can facilitate reducing the power consumption of a semiconductor device.

Figure 5A:
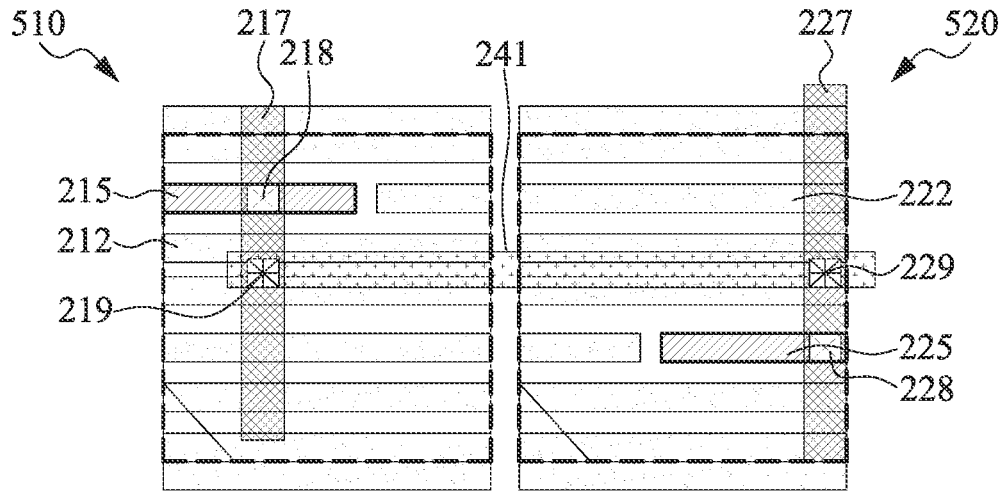
FIGS. 5A, 5B, and 5C are diagrams of a process for modifying a simulated integrated circuit design layout, in accordance with some embodiments of the present disclosure.
Figure 5B:
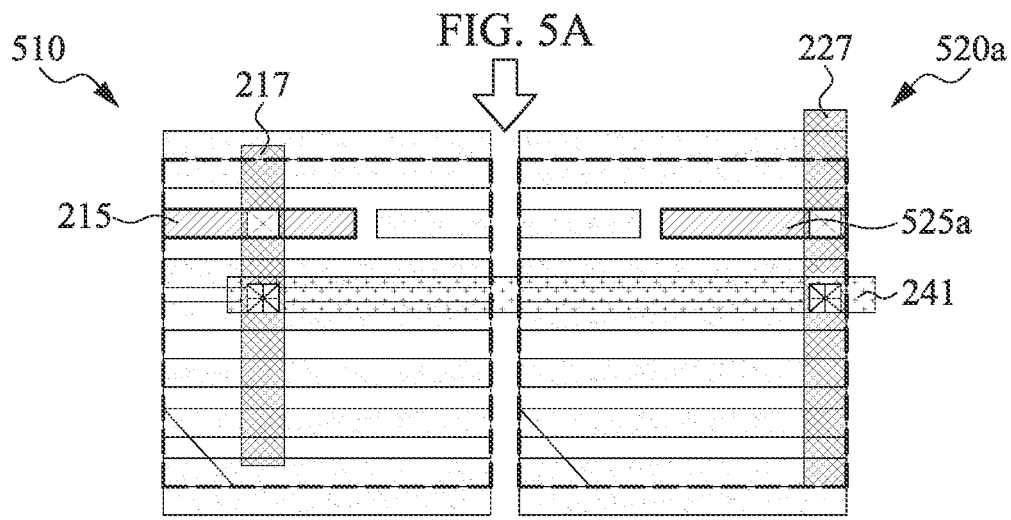
Figure 5C:
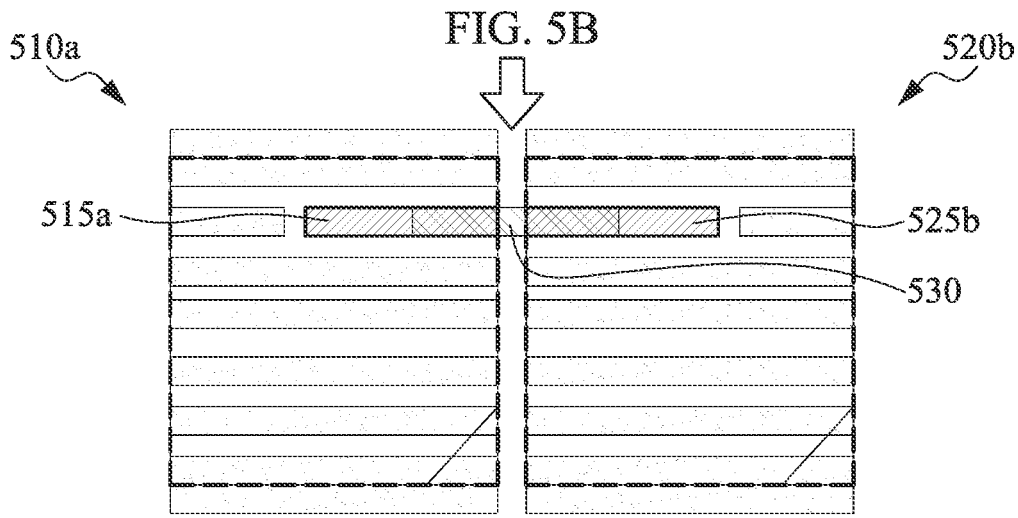

FIGS. 5A, 5B, and 5C are diagrams of processes for modifying a simulated integrated circuit design layout, in accordance with some embodiments of the present disclosure. The simulated integrated circuit design layout in FIG. 5A can be modified into the simulated integrated circuit design layout in FIG. 5B, and then be modified into the simulated integrated circuit design layout in FIG. 5C.

FIG. 5A is similar to FIG. 2A-1. As shown in FIG. 5A, the simulated integrated circuit design layout may include two cells 510 and 520. The cell 510 includes conductive segments 212, a conductive pattern 215, and conductive vias 218 and 219. The cell 520 includes conductive segments 222, a conductive pattern 225, and conductive vias 228 and 229. The simulated integrated circuit layout may include a conductive segment 217 above cell 510. The simulated integrated circuit layout may include a conductive segment 227 above the cell 520. The simulated integrated circuit layout may include a conductive segment 241 extending between the cell 510 and the cell 520. Detailed descriptions of such elements may be found in FIG. 2A-1, and thus are not repeated here. The differences between FIG. 2A-1 and FIG. 5A are that in FIG. 5A, the first track of the cell 510 is divided into two portions, wherein the left portion may be the conductive pattern 215, and the fourth track of the cell 520 is divided into two portions, wherein the right portion may be the conductive pattern 225.

Referring to FIG. 5B, the cell 510 in FIG. 5B may correspond to the cell 510 in FIG. 5A. The cell 520a in FIG. 5B is similar to the cell 520 in FIG. 5A, with a difference therebetween being that in FIG. 5B, the location of the conductive pattern 525a is placed in the first track of the cell 520a from the upper cell side. In other words, the elements in the fourth track may be swapped with the elements in the first track. In some embodiments, the conductive pattern 225 located in the fourth track is re-arranged to become the conductive pattern 525a in the first track. In some embodiments, the conductive pattern 525a may align with the conductive pattern 215. The conductive pattern 525a may align with the conductive pattern 215 horizontally.

As shown in FIG. 5B, the conductive pattern 215 may electrically connect to the conductive pattern 525a through the conductive segments 217, 241 and 227.

Referring to FIG. 5C, the simulated integrated circuit design layout in FIG. 5C is similar to the simulated integrated circuit design layout in FIG. 5B, with the difference therebetween being that in FIG. 5C, the elements in the cell 520b are symmetrical to the cell 520a in FIG. 5B, and that the elements in the cell 510a are symmetrical to the cell 510 in FIG. 5B. In some embodiments, the cell 520b in FIG. 5C can be obtained by flipping the cell 520a in FIG. 5B along a center of symmetry of the cell 520a extending vertically. Likewise, the cell 510a in FIG. 5C can be obtained by flipping the cell 510 in FIG. 5B along a center of symmetry of the cell 510 extending vertically.

As shown in FIG. 5C, the conductive pattern 515a on the right side of the cell 510a may be flipped from the conductive pattern 215 on the left side of the cell 510 in FIG. 5B. In some embodiments, the conductive pattern 525b on the left side of the cell 520b may be flipped from the conductive pattern 525a on the right side of the cell 520a in FIG. 5B. With both cells 510 and 520a flipped, the conducive pattern 525b may be adjacent to the conductive pattern 515a. In some embodiments, a direct conductive pattern 530 (M0 wire) may extend from the cell 510a to the cell 520b. The direct conductive pattern 530 can electrically connect the cell 510a to the cell 520b. The direct conductive pattern 530 may be located between the first track of the cell 510a and the cell 520b. In some embodiments, the direct conductive pattern 530 may correspond to the direct conductive pattern 30 in FIG. 1.

With the direct conductive pattern 530, the routing resources (such as the conductive segments 217, 227, and 241, and conductive vias 218, 219, 228, and 229) may be released for other functions. Therefore, the density of external routing and conductive segments around the cells 510a and 520b can be reduced. In addition, concise connections between adjacent cells can facilitate reducing the power consumption of a semiconductor device.

Figure 6A:
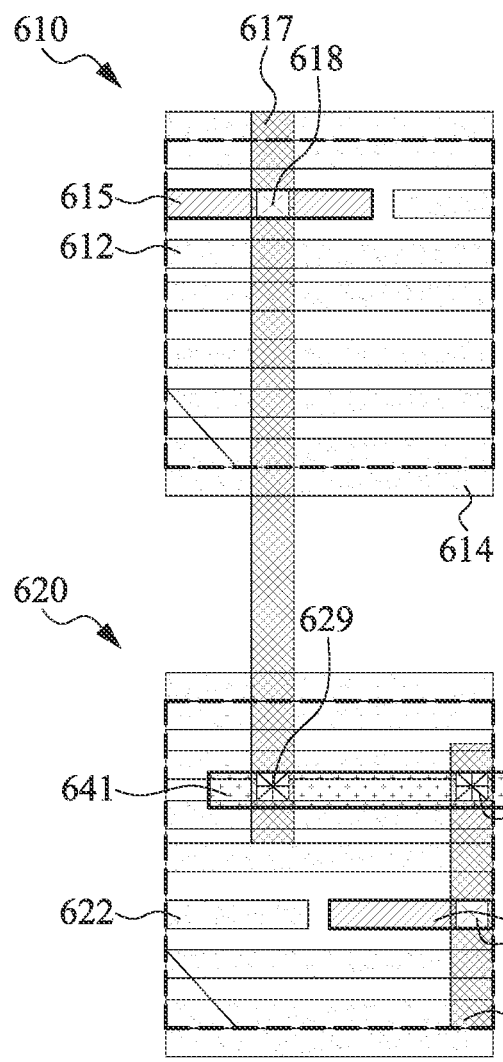
FIGS. 6A and 6B are diagrams of a process for modifying a simulated integrated circuit design layout, in accordance with some embodiments of the present disclosure.
Figure 6B:
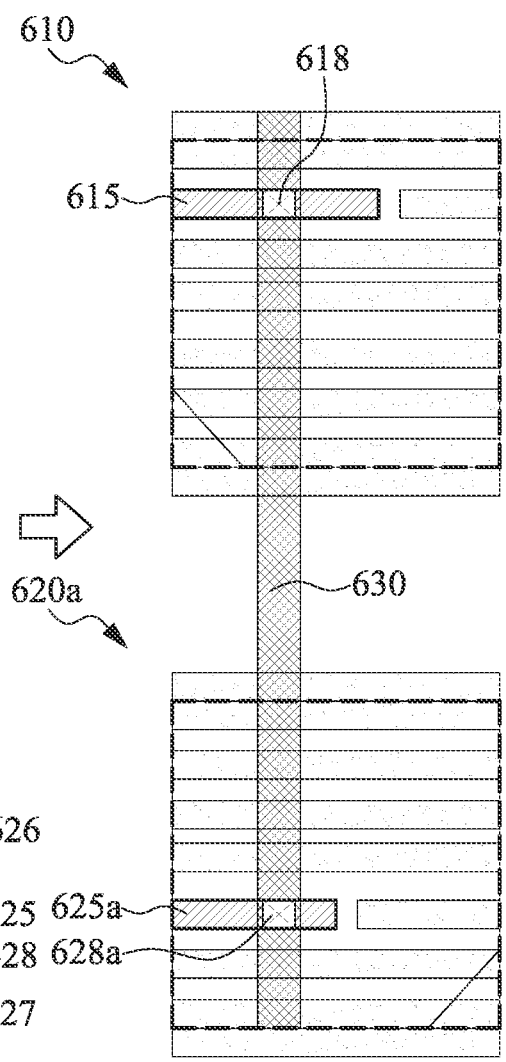

FIGS. 6A and 6B are diagrams of a processes for modifying a simulated integrated circuit design layout, in accordance with some embodiments of the present disclosure. The simulated integrated circuit design layout in FIG. 6A can be modified into the simulated integrated circuit design layout in FIG. 6B.

Referring to FIG. 6A, the simulated integrated circuit design layout may include two cells 610 and 620. The cell 610 includes conductive segments 612, a conductive pattern 615, and a conductive via 618. The cell 620 includes conductive segments 622, a conductive pattern 625, and conductive vias 626, 628, and 629. The simulated integrated circuit layout may include conductive segments 617, 627, and 641 above the cells 610 and 620.

Referring to FIG. 6A, the conductive segments (M0) 612 are arranged in a first layer (M0). The conductive segments 612 may extend horizontally. The number of conductive segments 612 in the cell 610 is not limited. For example, the number of conductive segments 612 may be five. In other embodiments, the number of conductive segments 612 in the cell 610 can be greater than or fewer than five. In some embodiments, the conductive segments 612 in the first layer are allocated into tracks for the cell 610. In some embodiments, each conductive segments may be divided into multiple portions. For example, the conductive segment 612 in the first track of the cell 610 may be divided into two portions.

In some embodiments, one of the conductive segments 612 can be a conductive pattern 615 (M0 pin). The number of conductive patterns 615 in the cell 610 is not limited. For example, the number of conductive patterns 615 can be one as shown in FIG. 6A. In some embodiments, the conductive pattern 615 may be placed in the first track of the cell 610. In some embodiments, the conductive pattern 615 may be placed in the left portion of the first track of the cell 610. The conductive pattern 615 can be configured as an input terminal or an output terminal of the cell 610.

In some embodiments, the conductive segment 617 is arranged in a second layer (M1). The second layer is above the first layer. That is, the conductive segment 617 is above the conductive segments 612. In some embodiments, the conductive segment 617 may extend perpendicular to the conductive segments 612. The conductive segment 617 may extend to the cell 620. The conductive segment 617 may electrically connect to one of the conductive segments 612. In some embodiments, the conductive segment 617 may be connected to the conductive pattern 615. The conductive segment 617 may electrically connect to the conductive pattern 615 through a conductive via 618 (VIA0), where the conductive via 618 may be disposed between the first layer and the second layer. In some embodiments, the conductive segment 617 and the conductive pattern 615 may overlap from a top-view perspective. The conductive via 618 may be disposed in the overlapping region of the conductive segment 617 and the conductive pattern 615.

Referring to FIG. 6A, the cell 620 is adjacent to the cell 610. In some embodiments, the cell 620 is similar to the cell 610. For example, the conductive segment (M0) 622 may correspond to the conductive segments 612; the conductive segment 627 may correspond to the conductive segment 617; and the conductive via 628 may correspond to the conductive via 618.

One of the differences between the cells 610 and 620 is that the conductive segment 622 in the fourth track of the cell 620 may be divided into a left portion and a right portion. In some embodiments, the conductive pattern 625 may correspond to the conductive pattern 615, while the conductive pattern 625 is placed in the fourth track of the cell 620. In some embodiments, the conductive pattern 625 may be placed in the right portion of the fourth track of the cell 620. Basically, point to be made is that conductive patterns 615 and 625 may not vertically align such that a single vertical conductive segment (for example, conductive segments 617 or 627) in upper layer cannot be sufficient to connect them.

In some embodiments, the conductive segment 627 and the conductive pattern 625 may overlap from a top-view perspective. The conductive via 628 may be disposed in the overlapping region of the conductive segment 627 and the conductive pattern 625. For example, the conductive via 628 may be disposed on the fourth track, i.e., the conductive pattern 625.

In some embodiments, the conductive segment 641 is arranged in a third layer (M2). The third layer is above the first layer. The third layer is above the second layer. The second layer is between the first layer and the third layer. That is, the conductive segment 641 is disposed above the conductive segments 622, 617, and 627. In some embodiments, the conductive segment 641 may extend parallel to the conductive segments 622. In some embodiments, the conductive segment 641 may align with one of the conductive segments 622. In some embodiments, the conductive segment 641 may misalign with the conductive segments 622. For example, the conductive segment 641 may be located between the first track and the second track of the cell 620 from a top-view perspective. In some embodiments, the conductive 641 may be within the cell boundary of the cell 620. In some embodiments, the conductive segment 641 may extend out of the cell boundary of the cell 620.

The conductive segment 641 may connect to the conductive segment 617 through the conductive via 629 (VIA1) and connect to the conductive segment 627 through the conductive via 626 (VIA1). The conductive vias 629 and 626 may be disposed between the second layer and the third layer. In some embodiments, the conductive segment 617 and the conductive segment 641 may overlap from a top-view perspective. The conductive via 629 may be disposed in the overlapping region of the conductive segment 617 and the conductive segment 641. Similarly, the conductive segment 627 and the conductive segment 641 may overlap from a top-view perspective. The conductive via 626 may be disposed in the overlapping region of the conductive segment 627 and the conductive segment 641. Accordingly, the cell 610 and 620 may be electrically connected. The conductive patterns 615 and 625 may be electrically connected through the conductive segments 617, 641, and 627, and the conductive vias 618, 626, 628, and 629.

Referring to FIG. 6B, the cell 610 in FIG. 6B may correspond to the cell 610 in FIG. 6A. The cell 620a in FIG. 6B is similar to the cell 620 in FIG. 6A, with a difference therebetween being that in FIG. 6B, the elements in the cell 620a are symmetrical to the cell 620 in FIG. 6A. In some embodiments, the cell 620a in FIG. 6B can be obtained by flipping the cell 620 in FIG. 6A along a center of symmetry of the cell 620 extending vertically. As shown in FIG. 6B, the cell 620a includes a conductive pattern 625a, and a conductive via 628a. The simulated integrated circuit layout may include a conductive segment 630 connecting the cell 610 and the cell 620a.

As shown in FIG. 6B, the conductive pattern 625a on the left side of the cell 620a may be flipped from the conductive pattern 625 on the right side of the cell 620 in FIG. 6A. After flipping, the conducive pattern 625a can be aligned with the conductive 615. The conductive pattern 625a may align with the conductive pattern 615 vertically. In some embodiments, the conductive via 628a can align with the conductive via 618 vertically. In some embodiments, a conductive segment 630 (M1 wire) may extend from the cell 610 to the cell 620a. The conductive segment 630 can electrically connect the cell 610 and the cell 620a. The conductive segment 630 is arranged in the second layer. That is, the conductive segment 630 is above the conductive patterns 615 and 625a. In some embodiments, the conductive pattern 625a may electrically connect to the conductive pattern 615 through the conductive segment 630 and the conductive vias 618 and 628a.

With the conductive segment 630, the routing resources (such as the conductive segments 617, 627, and 641) may be released for other functions. Therefore, the density of external routing and conductive segments around the cells 610 and 620a can be reduced. In addition, concise connections between adjacent cells can facilitate reducing the power consumption of a semiconductor device.

Figure 7A:
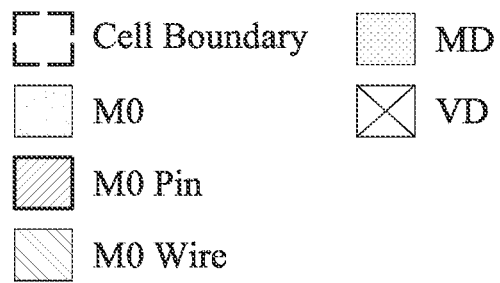
FIGS. 7A and 7B are diagrams of a process for modifying a simulated integrated circuit design layout, in accordance with some embodiments of the present disclosure.
Figure 7A:
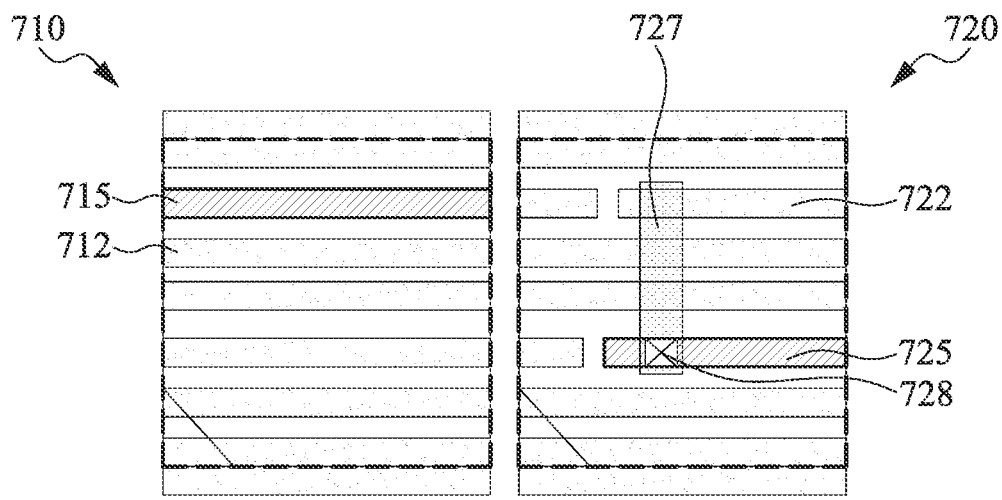
Figure 7B:
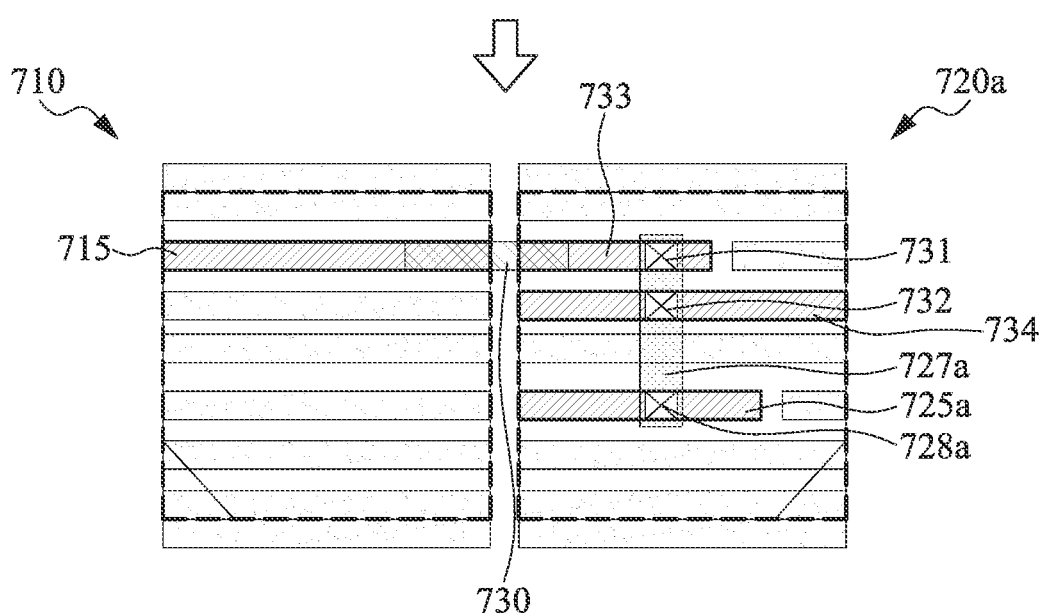

FIGS. 7A and 7B are diagrams of a processes for modifying a simulated integrated circuit design layout, in accordance with some embodiments of the present disclosure. The simulated integrated circuit design layout in FIG. 7A can be modified into the simulated integrated circuit design layout in FIG. 7B.

Referring to FIG. 7A, the simulated integrated circuit design layout may include two cells 710 and 720. The cell 710 includes conductive segments 712 and a conductive pattern 715. The cell 720 includes conductive segments 722 and a conductive pattern 725. The simulated integrated circuit layout may include a conductive segment 727 and a conductive via 728 above the cell 720.

Referring to FIG. 7A, the conductive segments (M0) 712 are arranged in a first layer (M0). The conductive segments 712 may extend horizontally. The number of conductive segments 712 in the cell 710 is not limited. For example, the number of conductive segments 712 may be five. In some embodiments, the conductive segments 712 in the first layer are allocated into tracks for the cell 710. In some embodiments, each conductive segments may be divided into multiple portions.

In some embodiments, one of the conductive segments 712 can be a conductive pattern 715 (M0 pin). The number of conductive patterns 715 in the cell 710 is not limited. For example, the number of conductive pattern 715 is one as shown in FIG. 7A. In other embodiments, the number of conductive pattern 715 in the cell 710 can be greater than one. The conductive pattern 715 may be placed in the first track of the cell 710. In some embodiments, the conductive pattern 715 may be configured as an input terminal or an output terminal of the cell 710.

Referring to FIG. 7A, the cell 720 is adjacent to the cell 710. In some embodiments, the cell 720 is similar to the cell 710. For example, the conductive segments (M0) 722 may correspond to the conductive segments 712.

In some embodiments, the conductive segment 722 in the first track of the cell 720 may be divided into a left portion and a right portion. Similarly, the conductive segment 722 in the fourth track of the cell 720 may be divided into a left portion and a right portion. In some embodiments, the left portion of the first track may align with the left portion of the fourth track. In some embodiments, the left portion of the first track may not align with the left portion of the fourth track. In some embodiments, the conductive pattern 725 may correspond to the conductive pattern 715, while the conductive pattern 725 may be placed in the fourth track of the cell 720. In some embodiments, the conductive pattern 725 may be placed in the right portion of the fourth track of the cell 720.

In some embodiments, one of the conductive segments 722 may be a conductive pattern 725 (M0 pin). The number of conductive patterns 725 in the cell 720 is not limited. For example, the number of conductive pattern 725 is one as shown in FIG. 7A. In other embodiments, the number of conductive pattern 725 in the cell 720 can be greater than one. The conductive pattern 725 may be placed in the fourth track of the cell 720. In some embodiments, the conductive pattern 725 may be placed in the right portion of the fourth track of the cell 720. In some embodiments, the conductive pattern 725 may be configured as an input terminal or an output terminal of the cell 720.

In some embodiments, the conductive segment 727 is arranged in a layer adjacent to the first layer. The conductive segment 727 may be disposed under the conductive segments 722. That is, the conductive segment 727 may be arranged in a zero layer (MD or PO). The zero layer is under the first layer in a cross-sectional perspective. In some embodiments, the zero layer may include metal layer (MD) and polysilicon contact (PO). The MD may horizontally align with the PO. In some embodiments, the MD may not horizontally align with the PO. In some embodiments, the conductive segment 727 may extend perpendicular to the conductive segments 722. In some embodiments, the conductive segment 727 may be within the cell 720. The conductive segment 727 may electrically connect to the conductive segments 722. In some embodiments, the conductive segment 727 may be connected to the conductive pattern 725. The conductive segment 727 may electrically connect to the conductive pattern 725 through a conductive via 728 (VD or VG), where the conductive via 728 may be disposed between the first layer and the zero layer. In some embodiments, the conductive segment 727 and the conductive pattern 725 may overlap from a top-view perspective. The conductive via 728 may be disposed in the overlapping region of the conductive segment 727 and the conductive pattern 725. For example, the conductive via 728 may be disposed on the fourth track, i.e., the conductive pattern 725. In some embodiments, the conductive vias VD and VG may be in the same layer. That is, the conductive vias VD and VG may be located between the zero layer and the first layer. The VD may have a height identical with the VG. In some embodiments, the MD may have a height different from the VG.

Referring to FIG. 7B, the cell 710 in FIG. 7B may correspond to the cell 710 in FIG. 7A. The cell 720a in FIG. 7B is similar to the cell 720 in FIG. 7A, with a difference therebetween being that in FIG. 7B, the elements in the cell 720a are symmetrical to the cell 720 in FIG. 7A. In some embodiments, the cell 720a in FIG. 7B can be obtained by flipping the cell 720 in FIG. 7A along a center of symmetry of the cell 720 extending vertically. As shown in FIG. 7B, the cell 720a includes a conductive pattern 725a, a conductive segment 727a, conductive vias 728a. 731, and 732. The simulated integrated circuit layout may include a conductive segment 730 between the cell 710 and the cell 720a.

As shown in FIG. 7B, the conductive pattern 725a on the right side of the cell 720a may be flipped from the conductive pattern 725 on the left side of the cell 720 in FIG. 7A. In some embodiments, the conductive segment 727a in the zero layer and the conductive pattern 725a in the first layer may overlap from a top-view perspective. The conductive via 728a may be disposed in the overlapping region of the conductive segment 727a and the conductive pattern 725a. For example, the conductive via 728a may be disposed on the left portion of the fourth track, i.e., the conductive pattern 725a.

In some embodiments, the conductive segment 727a may be disposed below the track aligned with the conductive pattern 715. In some embodiments, the conductive segment 727*a* may be disposed under the first track, the second track, the third track, and the fourth track of the cell 720*a*. The conductive segment 727*a* may electrically connect the first track, the second track, and the fourth track (the conductive pattern 725*a*) of the cell 720*a*, so that the first track and the second track may present the signal same as the conductive pattern 725*a*. With the connection to the conductive pattern 725*a*, the conductive patterns 733 and 734 may be formed in the left portion of the first track and the second track, respectively.

In some embodiments, the conductive segment 727*a* may electrically connect to the conductive pattern 733 through the conductive via 731 (VD or VG), where the conductive via 731 may be similar to the conductive via 728*a*. In some embodiments, the conductive via 731 may be disposed in the overlapping region of the conductive segment 727*a* and the conductive pattern 733. For example, the conductive via 731 may be disposed on the first track, i.e., the conductive pattern 733. In some embodiments, the conductive segment 727*a* may electrically connect to the conductive pattern 734 through the conductive via 732 (VD or VG), where the conductive via 732 may be similar to the conductive via 728*a*. In some embodiments, the conductive via 732 may be disposed in the overlapping region of the conductive segment 727*a* and the conductive pattern 734. For example, the conductive via 732 may be disposed on the second track, i.e., the conductive pattern 734. In some embodiments, the number of the tracks connecting to the conductive segment 727*a* may be determined by design needs.

In some embodiments, the conducive pattern 733 may be adjacent to the conductive pattern 715 horizontally. In some embodiments, a direct conductive pattern 730 (M0 wire) may extend from the cell 710 to the cell 720*a*. The direct conductive pattern 730 can electrically connect the cell 710 to the cell 720*a*. The direct conductive pattern 730 may be located between the first track of the cell 710 and the cell 720*a*. In some embodiments, the direct conductive pattern 730 may electrically connect the conductive patterns 715 and 725*a*. For example, the conductive pattern 715 may electrically connect to the conductive pattern 725*a* through the direct conductive pattern 730, the conductive pattern 733, and the conductive segment 727*a*. In some embodiments, the direct conductive pattern 730 may correspond to the direct conductive pattern 30 in FIG. 1.

In some embodiments, the conductive segment 727*a* can also be arranged in the second layer. The conductive segment 727*a* may be above the conductive patterns 733, 734, and 725*a*. The layer placing the conductive segment 727*a* may be determined by the design needs.

Figure 8A:
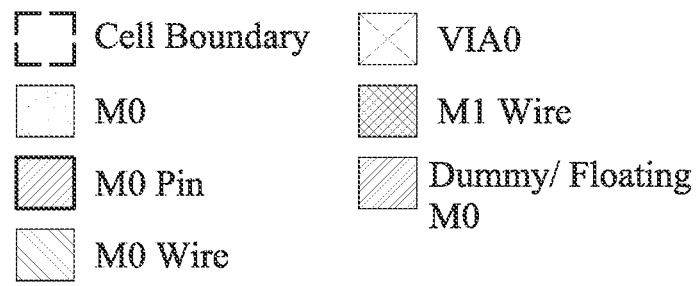
FIGS. 8A and 8B are diagrams of a process for modifying a simulated integrated circuit design layout, in accordance with some embodiments of the present disclosure.
Figure 8A:
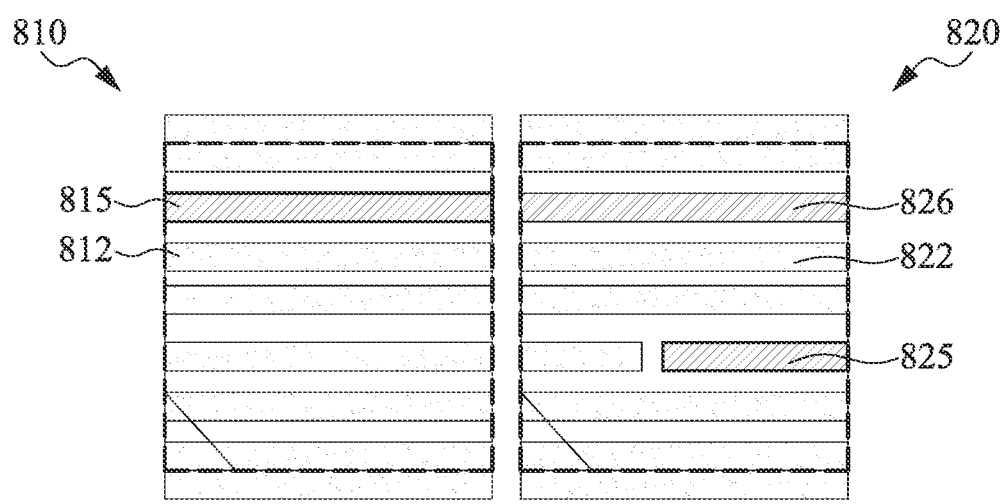
Figure 8B:
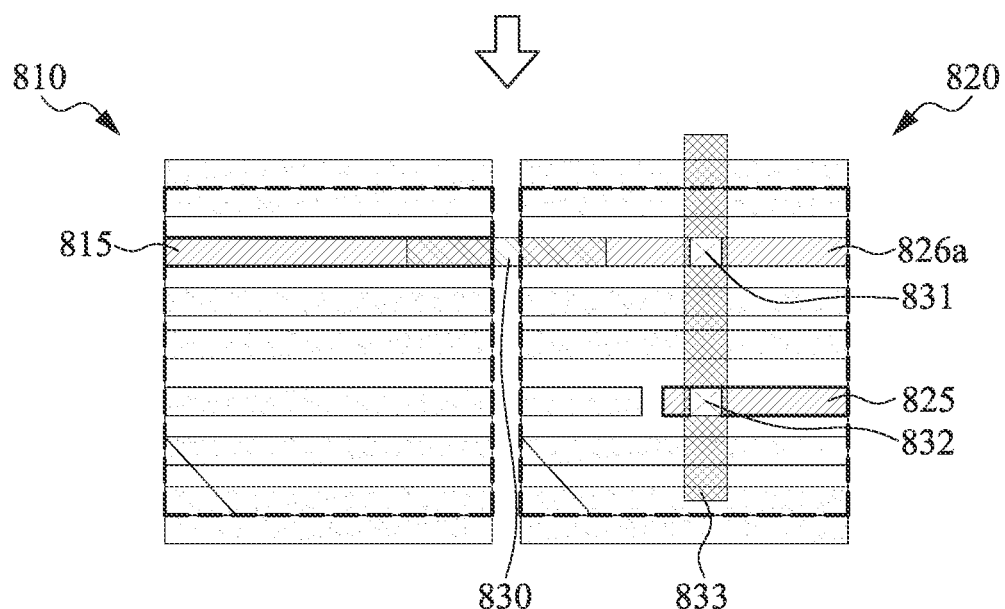

FIGS. 8A and 8B are diagrams of a process for modifying a simulated integrated circuit design layout, in accordance with some embodiments of the present disclosure. The simulated integrated circuit design layout in FIG. 8A can be modified into the simulated integrated circuit design layout in FIG. 8B.

Referring to FIG. 8A, the simulated integrated circuit design layout may include two cells 810 and 820. The cell 810 includes conductive segments 812 and a conductive pattern 815. The cell 820 includes conductive segments 822, a conductive pattern 825, and a dummy conductive segment 826.

Referring to FIG. 8A, the conductive segments (M0) 812 are arranged in a first layer (M0). The conductive segments 812 may extend horizontally. The number of conductive segments 812 in the cell 810 is not limited. For example, the number of conductive segments 812 may be five. In some embodiments, the conductive segments 812 in the first layer are allocated into tracks for the cell 810. In some embodiments, each conductive segments may be divided into multiple portions.

In some embodiments, one of the conductive segments 812 can be a conductive pattern 815 (M0 pin). The number of conductive patterns 815 in the cell 810 is not limited. For example, the cell 810 merely includes one conductive pattern 815 as shown in FIG. 8A. In other embodiments, the cell 810 can include more than one conductive patterns 815. The conductive pattern 815 can be placed in the first track of the cell 810. In some embodiments, the conductive pattern 815 can be configured as an input terminal or an output terminal of the cell 810.

Referring to FIG. 8A, the cell 820 is adjacent to the cell 810. The cell 820 is similar to the cell 810. For example, the conductive segments (M0) 822 may correspond to the conductive segments 812.

In some embodiments, the conductive segments 822 may be divided into multiple portions. For example, the conductive segment 822 in the fourth track of the cell 820 may be divided into a left portion and a right portion. In some embodiments, the conductive pattern 825 may be similar to the conductive pattern 815, while the conductive pattern 825 may be placed in the fourth track of the cell 820. In some embodiments, the conductive pattern 825 may be placed in the right portion of the fourth track of the cell 820. In some embodiments, the conductive pattern 825 may be configured as an input terminal or an output terminal of the cell 820.

In some embodiments, the cell 820 may include a dummy conductive segment (M0) 826 (also called floating conductive segment). The dummy conductive segment 826 is free of any electrical connections. In some embodiments, the dummy conductive segment 826 may be placed in the first track of the cell 820.

Referring to FIG. 8B, the cells 810 and 820 in FIG. 8B may be similar to the cells 810 and 820 in FIG. 8A, with a difference therebetween being that in FIG. 8B, the dummy conductive segment may be utilized to electrically connect the conductive pattern 815 to the conductive pattern 825.

As shown in FIG. 8B, the simulated integrated circuit layout may further include a conductive segment 833, and conductive vias 831 and 832 above the cell 820. In some embodiments, the simulated integrated circuit layout may include a conductive segment 830 between the cell 810 and the cell 820.

In some embodiments, the conductive segment 833 is arranged in a second layer (M1). The second layer is above the first layer. In other words, the conductive segment 833 is above the conductive segments 822. In some embodiments, the conductive segment 833 may extend perpendicular to the conductive segments 822. The conductive segment 833 may electrically connect to any one of the conductive segments 822. In some embodiments, the conductive segment 833 may be connected to the conductive pattern 825. The conductive segment 833 may electrically connected to the conductive pattern 825 through a conductive via 832 (VIA0), where the conductive via 832 may be disposed between the first layer and the second layer. In some embodiments, the conductive segment 833 and the conductive pattern 825 may overlap from a top-view perspective. The conductive via 832 may be disposed in the overlapping region of the conductive segment 833 and the conductive pattern 825.

With electrical connection, the dummy conductive segment 826 in FIG. 8A may become the conductive pattern 826*a* in FIG. 8B. In some embodiments, the conductive segment 833 may electrically connect to the conductive pattern 826a, so that the conductive pattern 826a may present the same signal as the conductive pattern 825. The conductive segment 833 may electrically connect to the conductive pattern 826a through a conductive via 831 (VIA0), where the conductive via 831 may be disposed between the first layer and the second layer. In some embodiments, the conductive segment 833 and the conductive pattern 826a may overlap from a top-view perspective. The conductive via 833 may be disposed in the overlapping region of the conductive segment 833 and the conductive pattern 826a.

In some embodiments, the conducive pattern 826a may be adjacent to the conductive pattern 815. In some embodiments, a direct conductive pattern 830 (M0 wire) may extend from the cell 810 to the cell 820. The direct conductive pattern 830 can electrically connect the cell 810 to the cell 820. The direct conductive pattern 830 may be located between the first track of the cell 810 and the cell 820. In some embodiments, the direct conductive pattern 830 may electrically connect the conductive patterns 815 and 825. For example, the conductive pattern 815 may electrically connect to the conductive pattern 825 through the direct conductive pattern 830, the conductive pattern 826a, and the conductive segment 833. In some embodiments, the direct conductive pattern 830 may correspond to the direct conductive pattern 30 in FIG. 1.

Figure 9:
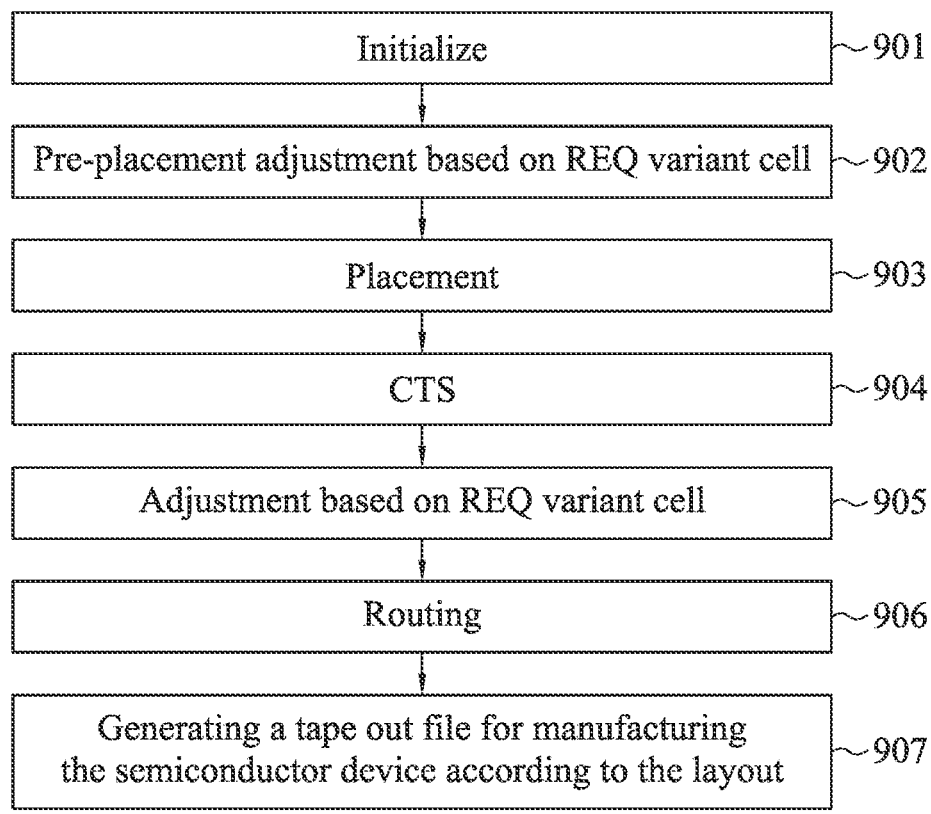
FIG. 9 is a flowchart of a method for generating a simulated integrated circuit design layout, in accordance with some embodiments of the present disclosure.

FIG. 9 is a flowchart 900 showing a method for generating a simulated integrated circuit design layout, in accordance with some embodiments of the present disclosure. In some embodiments, the method may include an automatic placement and routing (APR) process.

In some embodiments, the operations of the APR process in FIG. 9 may be carried out for the simulated integrated circuit design layout shown in FIGS. 1, 2A-1, 2A-2, 2B-1, 2B-2, and 4A-8B. However, the present disclosure is not limited thereto. In some embodiments, the APR process of the present disclosure may be applied on any suitable simulated integrated circuit design layout. With the method in accordance with some embodiments of the present disclosure, the direct connection between adjacent cells may improve.

The APR process as shown in FIG. 9 may begin in operation 901, initializing a pre-placement layout of a simulated integrated circuit design layout. For example, the pre-placement layout simulation may be generated by a data storage device for storing design data corresponding to an integrated circuit layout. In some embodiments, the pre-placement layout simulation may be performed, e.g., by an EDA tool, on the design to determine whether the design meets a predetermined specification. If the design does not meet the predetermined specification, the semiconductor device is redesigned. In some embodiments, a SPICE simulation is performed on the SPICE netlist. Other simulation tools are usable, in place of or in addition to the SPICE simulation, in other embodiments.

In operation 902, the cells in the pre-placement layout may be adjusted based on REQ variant cell in accordance with some embodiments of the present disclosure. In some embodiments, the standard cell may be adjusted to include direct connection between adjacent cells. In some embodiments, the standard cell may be adjusted based on estimated placement of standard cell in design floorplan to include direct connection between adjacent cells. In some embodiments, the cells may be adjusted according to the methods as shown in FIGS. 2A-1, 2A-2, 2B-1, 2B-2, 4A-4C, 5A-5C, 6A-6B, 7A-7B, and 8A-8B (which illustrate different methods to adjust the standard cell in accordance with some embodiments of the present disclosure).

To check all possible direct connections, all available REQ variant cells may be evaluated and stored in the standard cell library. If any combination of REQ variant cells for adjacent cells may align the conductive patterns in adjacent cells (such as the conductive patterns 215a and 225 in FIG. 2A-2), such that direct conductive pattern may generate direct connection between the cells. Then the original cell can be adjusted to that REQ variant combination.

In some embodiments, if the conductive patterns have similar relative position inside their individual standard cell layout, the conductive patterns can be aligned when the cell instances are placed adjacent to each other, and may generate direct connection therebetween (such as direct conductive pattern 30 in FIG. 30). In some embodiments, if the conductive patterns have no similar relative position inside their individual standard cell layout, then the cell may be adjusted based on the REQ variant cell layout to align the conductive patterns.

In some embodiments, multiple REQ variant cell layouts for the same cell type (having same dimensions/area/functionality), differing only in the location of the conductive pattern can be made available in standard cell library. The location flexibility of conductive patterns can identify cell layout which is the most efficient for routing, through use of direct connection (such as the direct conductive pattern 230 in FIG. 2A-2). In some embodiments, this method can be extended to any conductive patterns in any layer.

After the adjustment of pre-placement layouts completed, the initial pre-placement result can be reset, so that the placement engine or placement tool can utilize new information about direct connection, and place such cells closely in design layout.

In operation 903, an automated placement tool creates a placement of standard cells according to the IC design. In some embodiments, the automated placement tool may create a transistor level design by placing standard cells from a standard cell library to form the various logic and functional blocks according to the IC design. In some embodiments, the operation 902 may be performed on any time before placing the standard cells.

In operation 904, the Clock Tree Synthesis (CTS) may be performed after the placement of standard cells. In some embodiments, a CTS tool synthesizes a clock tree for the entire simulated integrated circuit design layout. As it synthesizes a clock tree, the CTS tool establishes only an approximate position for each buffer forming the clock tree and only approximates the routing of signal paths that will link the buffers to one another and to the syncs so that it can make reasonably accurate estimates of signal path delays through the clock tree.

In operation 905, the standard cell may be adjusted based on REQ variant cell in accordance with some embodiments of the present disclosure. In some embodiments, the standard cell may be adjusted to include direct connection between adjacent cells. In order to reduce the size and the density, the standard cell may be adjusted according to the methods as shown in FIGS. 2A-1, 2A-2, 2B-1, 2B-2, 4A-4C, 5A-5C, 6A-6B, 7A-7B, and 8A-8B (which illustrate different methods to adjust the standard cell in accordance with some embodiments of the present disclosure). According to the embodiments shown in FIGS. 2A-1, 2A-2, 2B-1, 2B-2, 4A-4C. 5A-5C, 6A-6B. 7A-7B, and 8A-8B, the adjustment may at least include flipping the cell and re-arranging element in the cell to create a direct connection between adjacent cells. In some embodiments, all potential connection between adjacent cells (horizontal or vertical) may be considered for the adjustment.

To check the possible direct connection, all available REQ variant cells may be evaluated and stored in the library. If any combination of REQ variant cells for adjacent cells may align the conductive patterns in adjacent cells (such as the conductive patterns 215a and 225 in FIG. 2A-2), such that direct conductive pattern may generate direct connection between the cells. Then the original cell can be adjusted to that REQ variant combination.

The impact on other elements in the cell in question may also be considered, by confirming whether the adjusted layout may lead to other elements having more complicated routing topology. In some embodiments, the routing overflow can be used as metric for such congestion estimation. In some embodiments, the adjustment may be performed at any step after the placement of standard cells.

In operation 906, an automatic routing tool then determines the connections needed between the devices in the standard cells, such as MOS transistors. Multiple transistors are coupled together to form adders, multiplexers, registers and the like in the routing step. Routing comprises the placement of signal net wires on a metal layer within placed standard cells to carry non-power signals between different functional blocks. In some embodiments, signal net wires are routed on a same metal level as one of the vertically adjacent metal layers in the multi-level power rails.

Once the routing is determined, automated layout tools are used to map the standard cells and the interconnections from the router onto a semiconductor device using the process rules, and the design rules, that are provided. All of these software tools are available commercially and may be purchased. Standard cell libraries that are parameterized for certain semiconductor wafer manufacturing facilities are also available.

In operation 907, a tape out data file corresponding to an integrated circuit layout of a semiconductor device may be generated.

In some embodiments, the adjustment based on REQ variant cells can be applied to any integrated circuit design layout and/or semiconductor manufacturing process to release the routing resources. In some embodiments, the integrated circuit design layouts can include FinFET devices and/or other planar or more complex structural semiconductor manufacturing processes.

Figure 10:
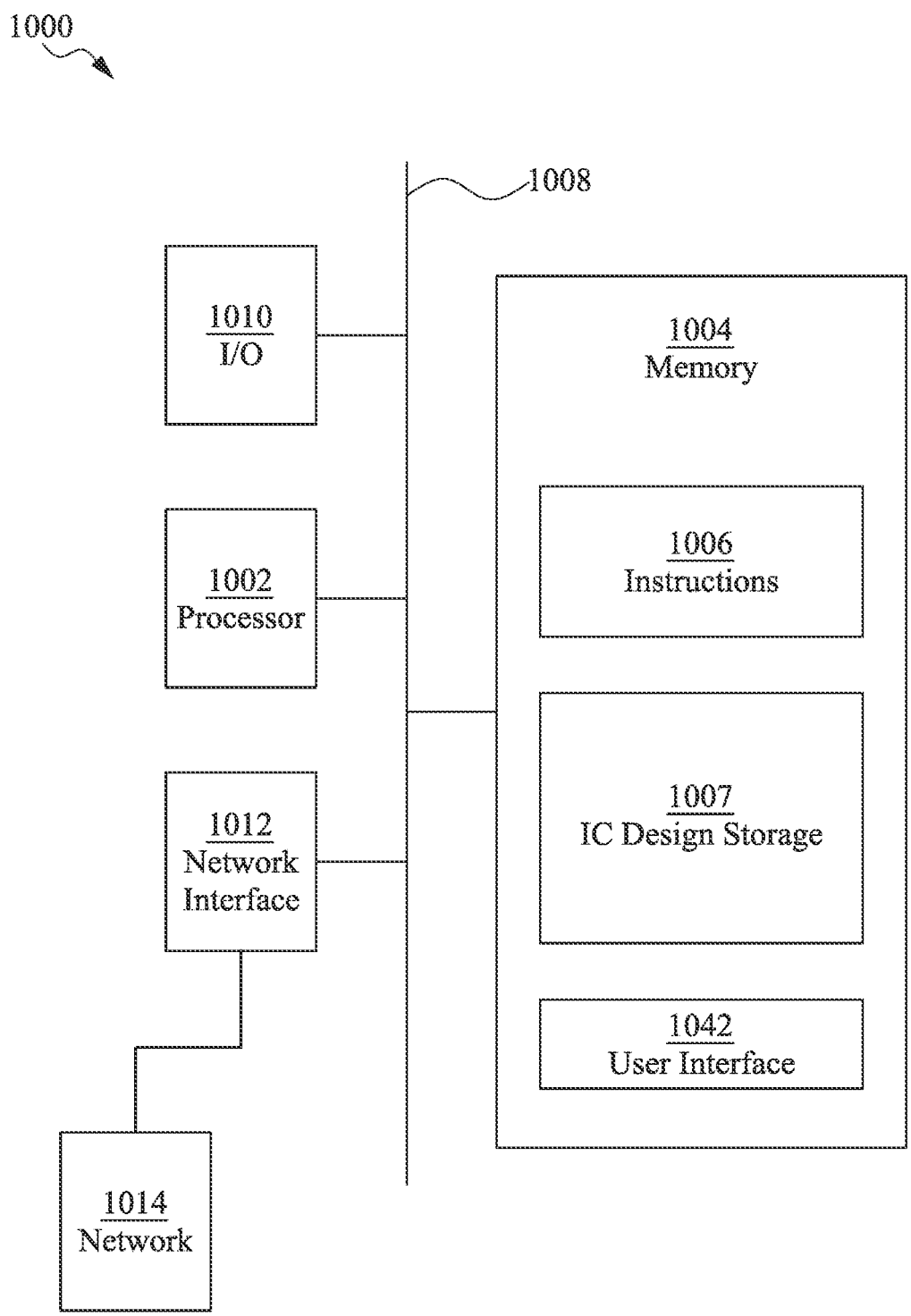
FIG. 10 is a block diagram of an IC layout diagram generation system, in accordance with some embodiments.

FIG. 10 is a block diagram of IC design system 1000, in accordance with some embodiments. Methods described herein of designing IC layout diagrams in accordance with one or more embodiments are implementable, for example, using IC design system 1000, in accordance with some embodiments. In some embodiments, IC design system 1000 can be an APR system, can include an APR system, or can be a part of an APR system, usable for performing an APR method.

In some embodiments, IC design system 1000 includes a processor 1002 and non-transitory, computer-readable memory 1004. Memory 1004, amongst other things, is encoded with, i.e., stores, computer program code, i.e., a set of executable instructions 1006. Execution of instructions 1006 by the processor 1002 represents (at least in part) an EDA tool which implements a portion or all of a method, e.g., a method of generating an IC layout diagram described above (hereinafter, the noted processes and/or methods).

Processor 1002 is electrically coupled to computer-readable memory 1004 via a bus 1008. Processor 1002 is also electrically coupled to an I/O interface 1010 by bus 1008. Network interface 1012 is also electrically connected to processor 1002 via bus 1008. Network interface 1012 is connected to a network 1014, so that processor 1002 and computer-readable memory 1004 are capable of connecting to external elements via network 1014. Processor 1002 is configured to execute instructions 1006 encoded in computer-readable memory 1004 in order to cause IC design system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, memory 1004 is an electronic, magnetic, optical, electromagnetic, infrared, and/or a semiconductor system (or apparatus or device). For example, memory 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, memory 1004 includes a compact disk-read only memory (CD-ROM), a compact disk-read/write (CD-R/W), and/or a digital video disc (DVD).

In one or more embodiments, memory 1004 stores instructions 1006 configured to cause IC design system 1000 (where such execution represents (at least in part) the EDA tool) to be usable for performing a portion or all of the noted processes and/or methods. In one or more embodiments, memory 1004 also stores information which facilitates performing a portion or all of the noted processes and/or methods. In one or more embodiments, memory 1004 includes IC design storage 1007 configured to store one or more IC layout diagrams, e.g., an IC layout diagram discussed above in accordance with FIGS. 1, 2A-1, 2A-2, 2B-1, 2B-2 and 4A-8B.

IC design system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

IC design system 1000 also includes network interface 1012 coupled to processor 1002. Network interface 1012 allows IC design system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC design systems 1000.

IC design system 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. IC design system 1000 is configured to receive information related to a UI through I/O interface 1010. The information is stored in memory 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC design system 1000. In some embodiments, a layout diagram which includes standard cells is generated using a tool such as VIRTUOSO®, available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 11:
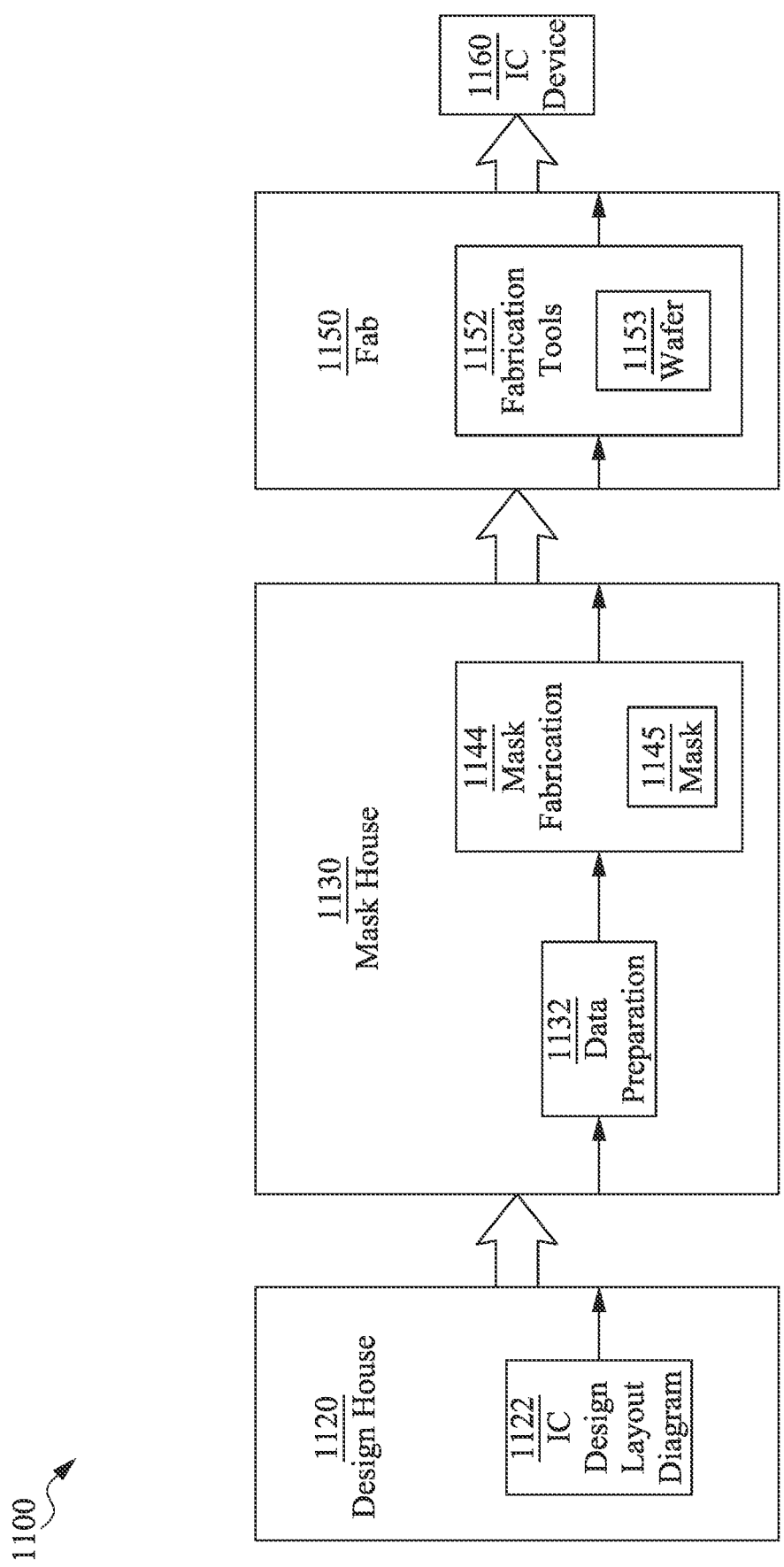
FIG. 11 is a block diagram of an IC manufacturing system, and an IC manufacturing flow associated therewith, in accordance with some embodiments.

FIG. 11 is a block diagram of IC manufacturing system 1100, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 1100.

In FIG. 11, IC manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC design layout diagram 1122. IC design layout diagram 1122 includes various geometrical patterns, e.g., an IC layout diagram discussed above. The geometrical patterns correspond to patterns of metal, oxide, or semiconductor layers that make up the various components of IC device 1160 to be fabricated. The various layers combine to form various IC features. For example, a portion of IC design layout diagram 1122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC design layout diagram 1122. The design procedure includes one or more of logic design, physical design or place and route. IC design layout diagram 1122 is presented in one or more data files having information of the geometrical patterns. For example, IC design layout diagram 1122 can be expressed in a GDSII file format or DFII file format.

Mask house 1130 includes data preparation 1132 and mask fabrication 1144. Mask house 1130 uses IC design layout diagram 1122 to manufacture one or more masks 1145 to be used for fabricating the various layers of IC device 1160 according to IC design layout diagram 1122. Mask house 1130 performs mask data preparation 1132, where IC design layout diagram 1122 is translated into a representative data file (RDF). Mask data preparation 1132 provides the RDF to mask fabrication 1144. Mask fabrication 1144 includes a mask writer. A mask writer converts the RDF to an image on a substrate, such as mask (reticle) 1145 or a semiconductor wafer 1153. The design layout diagram 1122 is manipulated by mask data preparation 1132 to comply with particular characteristics of the mask writer and/or requirements of IC fab 1150. In FIG. 11, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC design layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1122.

It should be understood that the description of mask data preparation 1132 has been simplified for the purposes of clarity. In some embodiments, data preparation 1132 includes additional features such as a logic operation (LOP) to modify the IC design layout diagram 1122 according to manufacturing rules. Additionally, the processes applied to IC design layout diagram 1122 during data preparation 1132 may be executed in a variety of different orders.

After mask data preparation 1132 and during mask fabrication 1144, a mask 1145 or a group of masks 1145 are fabricated based on the modified IC design layout diagram 1122. In some embodiments, mask fabrication 1144 includes performing one or more lithographic exposures based on IC design layout diagram 1122. In some embodiments, an electron-beam (e-beam) or a mechanism of multiple e-beams is used to form a pattern on a mask (photomask or reticle) 1145 based on the modified IC design layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift mask (PSM) technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 is an IC fabrication business that includes one or more manufacturing facilities for the fabrication of a variety of different IC products. In some embodiments. IC Fab 1150 is a semiconductor foundry. For example, there may be a manufacturing facility for the front-end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1150 includes wafer fabrication tools 1152 configured to execute various manufacturing operations on semiconductor wafer 1153 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1150 uses mask(s) 1145 fabricated by mask house 1130 to fabricate IC device 1160. Thus, IC fab 1150 at least indirectly uses IC design layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC design layout diagram 1122. Semiconductor wafer 1153 includes a silicon substrate or other proper substrate having material layers formed thereon. Semiconductor wafer 1153 further includes one or more of various doped regions, dielectric features, multilevel interconnects, and the like (formed at subsequent manufacturing steps).

According to some embodiments, a method for generating a layout of a semiconductor device is provided. The method includes placing a first cell and a second cell adjacent to the first cell; placing a first conductive pattern in a first track of the first cell extending in a first direction, wherein the first conductive pattern is configured as an input terminal or an output terminal of the first cell; placing a second conductive pattern in a first track of the second cell extending in the first direction, wherein the second conductive pattern is configured as an input terminal or an output terminal of the second cell; and aligning the first conductive pattern with the second conductive pattern.

According to other embodiments, a method for generating a layout of a semiconductor device is provided. The method includes placing a first cell and a second cell adjacent to the first cell; placing a first conductive pattern in a first track of the first cell extending in a first direction in a first layer, wherein the first conductive pattern is configured as an input terminal or an output terminal of the first cell; placing a second conductive pattern in a first track of the second cell extending in the first direction in the first layer, wherein the second conductive pattern is configured as an input terminal or an output terminal of the second cell; placing a third conductive pattern in the second cell in a second layer, the third conductive pattern extending in a second direction perpendicular to the first direction; electrically connecting the second conductive pattern and a fourth conductive pattern of the second cell through the third conductive pattern; and electrically connecting the first conductive pattern and the fourth conductive pattern of the second cell through a direct conductive pattern extending from the first cell to the second cell in the first layer, wherein the first conductive pattern aligns with the fourth conductive pattern of the second cell.

According to other embodiments, an apparatus for generating a layout of a semiconductor device. The apparatus includes at least one non-transitory computer-readable medium having stored thereon computer-executable instructions; and at least one processor coupled to the at least one non-transitory computer-readable medium. Wherein the computer-executable instructions are executable by the at least one processor and cause the apparatus to placing a first cell and a second cell adjacent to the first cell; placing an input/output terminal in a first track of the first cell; placing an input/output terminal in a first track of the second cell; and aligning the input/output terminal of the first cell with the input/output terminal of the second cell.

The methods and features of the present disclosure have been sufficiently described in the above examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A method for generating a layout of a semiconductor device, comprising:
   placing a first cell and a second cell adjacent to the first cell;
   placing a first conductive pattern in a first track of the first cell extending in a first direction, wherein the first conductive pattern is configured as an input terminal or an output terminal of the first cell;
   placing a second conductive pattern in a first track of the second cell extending in the first direction, wherein the second conductive pattern is configured as an input terminal or an output terminal of the second cell;
   aligning the first conductive pattern with the second conductive pattern;
   placing a third conductive pattern extending in a second direction perpendicular to the first direction from the first cell to the second cell, and
   connecting the first conductive pattern and the second conductive pattern through the third conductive pattern.

2. The method of claim 1, wherein aligning the first conductive pattern with the second conductive pattern comprises:
   re-arranging the first conductive pattern to a second track of the first cell extending in the first direction.

3. The method of claim 1, wherein aligning the first conductive pattern with the second conductive pattern comprises:
   flipping the first cell along a center of symmetry of the first cell extending in a second direction perpendicular to the first direction.

4. The method of claim 3, wherein aligning the first conductive pattern with the second conductive pattern comprises:
   re-arranging the second conductive pattern to a second track of the second cell extending in the first direction.

5. The method of claim 3, wherein aligning the first conductive pattern with the second conductive pattern comprises:
   flipping the second cell along a center of symmetry of the second cell extending in the second direction perpendicular to the first direction.

6. The method of claim 1, further comprising:
   electrically connecting the first conductive pattern and the second conductive pattern through a direct conductive pattern extending from the first cell to the second cell, wherein the direct conductive pattern is substantially level with the first conductive pattern and the second conductive pattern.

7. The method of claim 1, further comprising:
   providing a clock unit in the layout;
   routing the first cell, the second cell, and the clock unit in the layout; and
   generating a tape out file for manufacturing the semiconductor device according to the layout.

8. A method for generating a layout of a semiconductor device, comprising:
   placing a first cell and a second cell adjacent to the first cell;
   placing a first conductive pattern in a first track of the first cell extending in a first direction in a first layer, wherein the first conductive pattern is configured as an input terminal or an output terminal of the first cell;
   placing a second conductive pattern in a first track of the second cell extending in the first direction in the first layer, wherein the second conductive pattern is configured as an input terminal or an output terminal of the second cell;
   placing a third conductive pattern in the second cell in a second layer, the third conductive pattern extending in a second direction perpendicular to the first direction;
   electrically connecting the second conductive pattern and a fourth conductive pattern of the second cell through the third conductive pattern; and
   electrically connecting the first conductive pattern and the fourth conductive pattern of the second cell through a direct conductive pattern extending from the first cell to the second cell in the first layer, wherein the first conductive pattern aligns with the fourth conductive pattern of the second cell.

9. The method of claim 8, wherein the first layer is disposed above the second layer.

10. The method of claim 8, wherein the first layer is disposed under the second layer.

11. The method of claim 8, further comprising:
    flipping the second cell along a center of symmetry of the second cell extending in the second direction.

12. The method of claim 11, further comprising:
    flipping the first cell along a center of symmetry of the first cell extending in the second direction.

13. The method of claim 8, wherein the direct conductive pattern is substantially level with the first conductive pattern and the fourth conductive pattern.

14. The method of claim 8, further comprising:
    providing a clock unit in the design layout;
    routing the first cell, the second cell, and the clock unit in the design layout; and
    generating a tape out file for manufacturing a semiconductor device according to the design layout.

15. An apparatus for generating a layout of a semiconductor device, comprising:
    at least one non-transitory computer-readable medium having stored thereon computer-executable instructions; and
    at least one processor coupled to the at least one non-transitory computer-readable medium, wherein the computer-executable instructions are executable by the at least one processor and cause the apparatus to:
    placing a first cell and a second cell adjacent to the first cell;
    placing an input/output terminal in a first track of the first cell;
    placing an input/output terminal in a first track of the second cell;
    aligning the input/output terminal of the first cell with the input/output terminal of the second cell; and
    placing a third conductive pattern extending perpendicular to the input/output terminal of the first cell, wherein the third conductive pattern connects the input/output terminal of the first cell and the input/output terminal of the second cell.

16. The apparatus of claim 15, wherein aligning the input/output terminal of the first cell with the input/output terminal of the second cell comprises:
    re-arranging the input/output terminal of the first cell to a second track of the first cell.

17. The apparatus of claim 15, wherein aligning the input/output terminal of the first cell with the input/output terminal of the second cell comprises:
   flipping the first cell along a center of symmetry of the first cell.

18. The apparatus of claim 15, further comprising:
   electrically connecting the input/output terminal of the first cell and the input/output terminal of the second cell through a direct conductive pattern extending from the first cell to the second cell.

19. The method of claim 18, wherein the direct conductive pattern is substantially level with the input/output terminal of the first cell and the input/output terminal of the second cell.

20. The method of claim 15, further comprising:
   providing a clock unit in the layout;
   routing the first cell, the second cell, and the clock unit in the layout; and
   generating a tape out file for manufacturing the semiconductor device according to the layout.

\* \* \* \* \*